(12) United States Patent
Fofana

(10) Patent No.: US 11,375,686 B2
(45) Date of Patent: Jul. 5, 2022

(54) CAT SUSPENSION AND TRAINING APPARATUS

(71) Applicant: Linda J. Fofana, Littleton, CO (US)

(72) Inventor: Linda J. Fofana, Littleton, CO (US)

( * ) Notice: Subject to any disclaimer, the term of this patent is extended or adjusted under 35 U.S.C. 154(b) by 282 days.

(21) Appl. No.: 16/502,339

(22) Filed: Jul. 3, 2019

(65) Prior Publication Data
US 2020/0008391 A1 Jan. 9, 2020

Related U.S. Application Data

(60) Provisional application No. 62/694,417, filed on Jul. 5, 2018.

(51) Int. Cl.
*A01K 1/06* (2006.01)
*A01K 15/02* (2006.01)

(52) U.S. Cl.
CPC ............ *A01K 1/0613* (2013.01); *A01K 15/02* (2013.01)

(58) Field of Classification Search
CPC ........ A01K 1/0613; A01K 15/02; A01K 1/06; A01K 27/002; A01K 15/04; A01K 15/00; A01K 13/001; A01K 13/00; A61D 2003/006; A61D 3/00
See application file for complete search history.

(56) References Cited

U.S. PATENT DOCUMENTS

| | | |
|---|---|---|
| 1,233,309 A | 7/1917 | Byrd |
| 4,355,600 A | 10/1982 | Zielinski |
| 4,597,602 A | 7/1986 | McGriff |
| 4,831,967 A | 5/1989 | Anderson |
| 4,962,731 A | 10/1990 | Wexler |
| 5,009,196 A * | 4/1991 | Young ...................... A61D 3/00 119/728 |
| 5,178,098 A * | 1/1993 | Samberg ................ A01K 13/00 119/600 |
| 5,603,288 A | 2/1997 | Ferber |

(Continued)

FOREIGN PATENT DOCUMENTS

EP 1366658 A1 5/2002

OTHER PUBLICATIONS

OMLAB, The Canine Ocular Motility Laboratory.
(Continued)

*Primary Examiner* — Trinh T Nguyen

(57) ABSTRACT

Embodiments include a cat suspension and training apparatus that provides a stress-free environment to train fearful or intolerant cats, designed while considering a cat's unique anatomy. Among other things, embodiments of the present disclosure include systems and methods to suspend and train a cat with a cat suspension and training apparatus. In one embodiment, a cat suspension and training apparatus includes at least a raised structure coupled with a sling by suspension structures, with the raised structure comprising a base, a plurality of support legs, height adjustment and outward angle adjustment capability, crossbeams, and a rotatable shelf. The apparatus may have a plurality of configurations, including a receiving configuration, a resting configuration, and a closed configuration. Additional embodiments include the apparatus including limb security straps comprising a metacarpal strap to limit leg mobility of a cat.

17 Claims, 18 Drawing Sheets

(56) References Cited

U.S. PATENT DOCUMENTS

| | | | |
|---|---|---|---|
| 5,823,146 A * | 10/1998 | Aniz | A61D 3/00 119/725 |
| 5,960,746 A | 10/1999 | Salts | |
| 6,123,049 A | 9/2000 | Slater | |
| 6,199,508 B1 * | 3/2001 | Miale | A61D 3/00 119/28.5 |
| 6,516,753 B1 * | 2/2003 | Taylor | A01K 13/00 119/600 |
| 6,640,751 B1 | 11/2003 | Cool | |
| 6,729,263 B2 * | 5/2004 | Miale | A61D 3/00 119/28.5 |
| 7,806,089 B2 | 10/2010 | Walker-Indyke | |
| 8,038,158 B1 * | 10/2011 | White | A47D 13/08 280/32.5 |
| 9,339,012 B2 | 5/2016 | McClain | |
| 2005/0005875 A1 * | 1/2005 | Suggs | A01K 13/001 119/728 |
| 2005/0263102 A1 | 12/2005 | Sherman | |
| 2008/0223309 A1 * | 9/2008 | Winders | A01K 15/00 119/728 |
| 2009/0126650 A1 * | 5/2009 | Walker-Indyke | A01K 13/001 119/601 |
| 2012/0186537 A1 | 7/2012 | Curtis | |
| 2013/0213318 A1 * | 8/2013 | Katz | A01K 15/00 119/754 |
| 2016/0045294 A1 * | 2/2016 | Sherman | A61D 3/00 119/28.5 |
| 2016/0066541 A1 * | 3/2016 | Storum | A01K 15/04 119/756 |
| 2016/0338321 A1 * | 11/2016 | Simons | A01K 15/04 |
| 2019/0230898 A1 * | 8/2019 | Cassell | A01K 1/0613 |
| 2019/0297836 A1 * | 10/2019 | Roa | A01K 1/06 |
| 2021/0259212 A1 * | 8/2021 | Meneou, II | A01K 15/04 |

OTHER PUBLICATIONS

Kickstarter, The Doggie Lift—The Easiest Way to Cut Your Dog's Nails, Sep. 22, 2016.
Aliexpress, Dogs Front Carrier Lift Harness Dogs Lift Support Rehabilitation Harness Helping Support for Elderly or Arthritis Dogs.
Technogroom, LIPS Hammock.
Amazon, Diamond Cut Helping Hand Dog Grooming Sling.
Calming Cradles, Teacup Size Calming Cradle with Multi Coloured Paw Print Material with Clips.
Oddity mall, Cat Straight Jacket and Muzzle.

* cited by examiner

CAT SUSPENSION AND TRAINING APPARATUS

CROSS-REFERENCE TO RELATED APPLICATIONS

This application claims the benefit of U.S. Provisional Application No. 62/694,417, filed Jul. 5, 2018, the disclosure of which is hereby incorporated by reference in its entirety.

TECHNICAL FIELD

Embodiments of the present disclosure relate to a cat suspension and training apparatus.

BACKGROUND

Various cat training activities often involve generally cumbersome processes that create a stressful and dangerous environment for both the cat and the human attempting to train the cat. Some examples of cat training activities include bathing preparation, building comfort with clipping nails, and preparing the cat for veterinary care. In all of these examples a cat, depending on its tolerance and training, may need to be restrained to prevent harm to both the cat and human involved. Avoidance of these activities is not an option: cats, like humans, need to be bathed; long claws must be clipped to prevent snagging; and preventative veterinary care and shot records must be kept current for a cat's health and to prevent the spread of disease.

Cat restraint devices currently on the market often provide a less than optimal environment for both humans and cats either because cats are not fully restrained or because the restraint device is too complicated, time consuming, and/or difficult to successfully restrain a cat. Alternatively, some marketed devices may properly restrain the cat, but do not allow sufficient access points to the body of the cat for purposes such as bathing or veterinary care. Some inadequacies in the current technology allow cats to squirm out of restraints because the restraints were not specifically designed to accommodate the anatomy of a cat. In particular, universal animal restraint devices, or even restraint devices designed to fit dogs, fail to restrain cats due to a cat's unique anatomy.

A cat's anatomy allows for unique maneuverability and creates an animal with expert escape characteristics. There are at least three features of a cat's anatomy that lay the foundation for a cat's proclivity to escape: (1) shoulder blade attachment, (2) spine flexibility, and (3) claw orientation.

(1) The way in which a cat's arm is connected to a cat's shoulder is different than dogs, humans, and many other animals. Specifically, unlike dogs, cats do not have shoulder blades. Instead, a cat's forearms are connected to the rest of the body by a floating clavicle bone that allows a cat to move forearms in a range of motion large enough to permit a cat to fit through any space in which its head can fit. Therefore, a cat may be able to move forearms in a way to slide out of small spaces or restraint devices.

(2) A cat's spine has features that enable 180-degree lateral bending. This wide range of motion is attributed to a cat having excess lumbar and thoracic vertebrae cushioned by elastic disks. Additionally, the wide range of motion allows for cats to flexibly twist and maneuver out of tight areas or restraints.

(3) The orientation and positioning of a cat's claws allows a cat to optimize traction and adherence to surfaces. In particular, a cat's claws are retractable, remaining sheathed in a relaxed state until a cat voluntarily extends claws for reasons including hunting, climbing, or during times when a cat is in need of escape or self-defense. Thus, a cat may extend claws to a variety of angles in order to engage a target surface, for instance a target surface that is suspending the cat.

It is with respect to these and other general considerations that the aspects disclosed herein have been made. Although relatively specific problems may be discussed, it should be understood that the examples should not be limited to solving the specific problems identified in this section or elsewhere in this disclosure.

BRIEF SUMMARY

The subject matter of the present disclosure is directed to providing a stress-free environment to train cats in which both the trainer and the cat remain free of injury and can, over a period of time, teach the cat to tolerate various activities. Specifically, the present disclosure describes a restraint apparatus that is designed in consideration of a cat's unique anatomy.

Among other things, embodiments of the present disclosure include systems and methods to suspend and train a cat with a cat suspension and training apparatus. In one embodiment, a cat suspension and training apparatus includes at least a raised structure coupled with a sling by suspension structures, with the raised structure comprising a base, a plurality of support legs, height adjustment and outward angle adjustment capability, crossbeams, and/or a rotatable shelf. The apparatus may have a plurality of configurations according to one or more embodiments, including a receiving configuration, a resting configuration, and a closed configuration. In one embodiment, the cat suspension and training apparatus may also include limb security straps comprising a metacarpal strap to limit leg mobility of a cat.

Additional embodiments of the present disclosure provide various positioning mechanisms and configurations for the raised structure, including but not limited to height adjustment, width adjustment, a receiving configuration, a closed configuration, configuration transitioning components, and/or rotational capabilities.

BRIEF DESCRIPTION OF THE DRAWINGS

The accompanying figures illustrate one or more embodiments of the disclosed pet restraint system and, together with the detailed description, serve to explain aspects and implementations of a cat bathing and training apparatus. In the appended figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label. Embodiments are described in conjunction with the appended figures.

Figure 1:
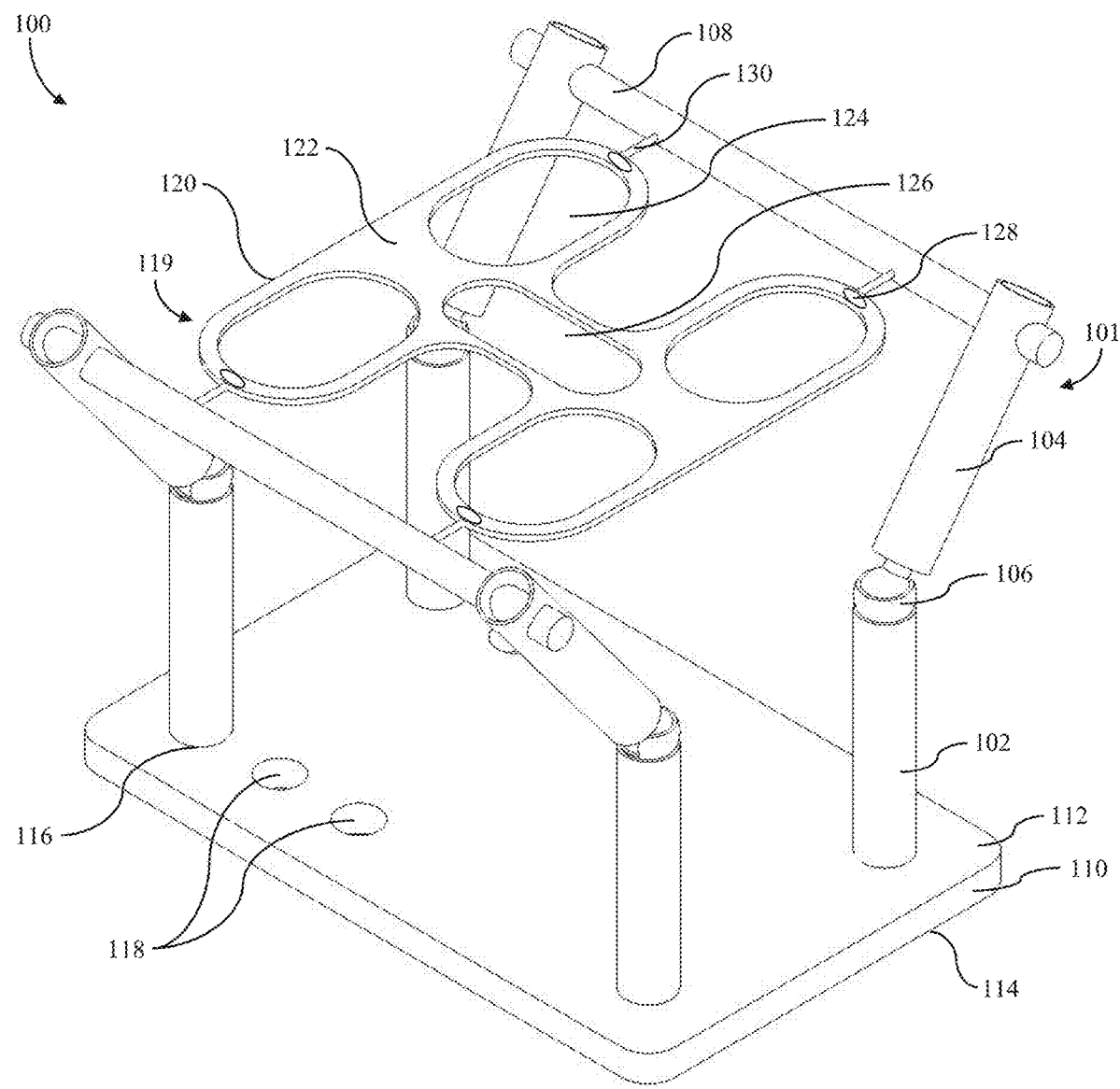
FIG. 1 shows a perspective view of a cat suspension and training apparatus in a receiving configuration.

While embodiments of the disclosure are amenable to various modifications and alternative forms, specific embodiments have been shown by way of example in the drawings and are described in detail below. The intention is not to limit the scope of the disclosure to the particular embodiments described. On the contrary, the disclosure is intended to cover all modifications, equivalents, and alternatives falling within the scope of the disclosure and the appended claims.

DETAILED DESCRIPTION

All illustrations of the drawings are for the purpose of describing selected embodiments and are not intended to limit the scope of the claims. The ensuing Detailed Description provides exemplary embodiments, and is not intended to limit the scope, applicability or configuration of the disclosure. Rather, the ensuing Detailed Description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Throughout this description, references made to any cat to be suspended by the cat suspension and training apparatus may also be made in relation to any other animal. In particular, the suspension and training apparatus may be used to suspend and train house cats, big cats, any other felines, dogs, ferrets, other house pets, exotic animals, or any other animal. Although a cat is used as an example animal throughout this description, it should be understood that unless otherwise specified, the described cat suspension and training apparatus could be used with any animal and/or any feline, and is not limited to domesticated cats.

Additionally, throughout this description, references to orientation (e.g., front, rear, top, bottom, back, right, left, upper, lower, etc.) of the cat suspension and training apparatus, or components thereof, relate to relative orientation as illustrated in the accompanying drawings and are used for ease of description only. No restriction is intended by use of orientation terms regardless of how the apparatus may be situated.

A cat suspension and training apparatus may be easily assembled and dissembled, and may be manufactured using readily available and/or affordable parts. In some examples, aspects of the raised structure of the apparatus may be manufactured from any of a variety of metals, woods, plastics, and/or composite materials, or any combination thereof. In other examples, the sling of the apparatus may be manufactured from similar or different materials or fabrics as compared to the raised structure. In still other examples, the limb security strap of the apparatus may be manufactured from similar or different materials or fabrics as compared to the raised structure and the sling, and may have elastic or resilient qualities.

As discussed in greater detail, below, aspects of the cat suspension and training apparatus may have a variety of applications, including, but not limited to, bathing, veterinary care, grooming, radiology, and tolerance training. In an example, the apparatus may be used to assist in bathing a cat that is not accustomed to, or that is afraid of, water. Aspects of the present disclosure may be used with cats for a variety of reasons in which a cat may be intolerant or fearful, which would otherwise present safety concerns to humans and other animals in the area if not for a way to safely retain the cat. In a further example, the apparatus may be raised or lowered to potentially allow a suspended cat's feet to contact the base of the raised structure.

Some embodiments described herein can be used to assist in training of a cat. In one such case, use of the suspension and training apparatus can involve the following, which may be described in a training manual to accompany the cat suspension and training apparatus. By allowing various amounts of contact with the base, a suspended cat can be trained or can become accustomed to the previously fear- or intolerance-inducing environment with a goal of eventually build up a cat's tolerance so that the apparatus is no longer required. For example, a cat may be lowered to a height in the sling over time to gradually allow the cat more and more contact with the base until the cat is actually standing on its own, rather than being suspended. At that point, the cat may transition to not needing to use the apparatus at all. However, until that time, the disclosed configurations enable a fast and easy way to successfully restrain and immobilize a cat through suspension, requiring little to no interaction with the apparatus, minimizing the period of time in which surrounding humans or other animals could potentially be hurt by the cat being suspended. While example applications of the disclosed apparatus are discussed, the scope of the present disclosure is not so limited.

Additionally, the apparatus may be employed for day-to-day home use, and may have easy assembly and disassembly instructions and features. For example, a home-owner may set up the apparatus in a sink or a bathtub. In some examples, the apparatus may be easily disassembled or collapsed into a few, largely-flat components that may be easily stored and/or assembled for use at a later time.

FIG. 1 shows a perspective view of a cat suspension and training apparatus 100 in a receiving configuration. In some examples, the apparatus 100 may comprise at least two components, a raised structure 101 and a sling 119. The raised structure 101 is positioned and configured to suspend the sling 119 above the ground or floor. As an example, the raised structure 101 may comprise a base 110, bottom support rods 102, top support rods 104, configuration transitioning joints 106, and crossbeams 108.

The bottom support rods 102 may engage with the base 110 at a support rod connection interface 116 of the base 110. Bottom support rods 102 may be hollow, or solid, or a combination thereof. Additionally, the bottom support rods 102 may allow for drainage through the base 110 at or along the support rod connection interface 116 to prevent perpetually wet or unaerated interiors of the bottom support rods 102. From the support rod connection interface 116, a bottom support rod 102 may extend from the base a bottom support rod distance, upward. One end of the bottom support rod 102, the end opposite a support rod connection interface 116, the bottom support rod 102 may interface with a configuration transitioning joint 106. The configuration transitioning joint 106 may be a ball joint, hinge, limited angle hinge, flexible or bendable joint, or similar aperture that allows flexing or bending of an otherwise straight component.

The top support rods 104 may be coupled with the configuration transitioning joint 106 at the configuration transitioning joint 106 along with the point of connection between the bottom support rod 102 and the configuration transitioning joint 106. The top support rods 104 may extend from the configuration transitioning joint 106 a top support rod distance, upward. In one embodiment, the apparatus 100 includes four support legs (comprising a bottom support rod 102, configuration transitioning joint 106, and top support rod 104). Additionally, the raised structure 101 may comprise a crossbeam 108 positioned between two support legs of the raised structure 101, coupled to the support legs substantially near the end of the top support rod 104 substantially opposite the end coupled with the configuration transitioning joint 106. The crossbeams 108 may be removably or permanently coupled to the top support rods 104, for example by rod-and-hole friction interface, integration into one material, or any other removable or permanent interfacing combination or mechanism. In another example, the raised structure 101 may comprise at least two crossbeams 108 configured may be substantially parallel to each other, each on right and left sides of the raised structure 101.

A base 110 of the raised structure 101 may comprise a top face 112 and bottom attachment face 114 of the base 110. Although the base may be constructed with a wide variety of materials, hard materials will more easily prevent a cat's claw from being able to sink into and adhere to the base 110, thus increasing the effectiveness of the cat immobilization apparatus 100 through suspension in some embodiments. The bottom attachment face 114 may be configured to removably engage a ground surface or floor surface, thus stabilizing the apparatus 100 via the raised structure 101. The bottom attachment face 114 may be made of an adhering material, such as rubber, sticky tack, or a non-permanent adhesive paint or coating, or any other adhering or frictionally-engaging material, or, alternatively, may comprise removable floor- or ground-coupling devices, such as suction cups, tacks, clamps, or any other mechanism of coupling the bottom attachment face 114 with a ground or floor surface. The top face 112 of the base 110 may comprise a support rod connection interface 116, enabling a bottom support rod 102 to be coupled with the base 110. The support rod connection interface 116 may comprise any of a variety of mechanisms to easily couple components for easy disassembly, for example friction fit, screw tightening, slide and lock, or any other mechanism of removably coupling the bottom support rod 102 with the top face 112 of the base 110 at a support rod connection interface 116. In a further example, the top face 112 of the base 110 may comprise a plurality of optional locational placements for a support rod connection interface 116, thus including support rod width adjustment interfaces 118 of the base 110. The support rod width adjustment interfaces 118 may be configured as a pre-distanced set of support rod connection interfaces 116 positioned varying widths apart such that the support legs may be adjusted to be closer or further apart. Allowing for varying width adjustments will ensure that the raised structure 101 is configured for the size of the cat or sling 119 and its harness, respectively, as cats come in all sizes. Alternatively, one or more of the support legs may be slideable with respect to a pre-distanced set of support rod interfaces 116, or uniquely and independently adjustable about the base 110. The rod width adjustment interfaces 118 may allow for frontal, lateral, or diagonal support leg adjustment about the base 110, including and in addition to that which FIG. 1 depicts.

A sling 119 of a cat suspension and training apparatus 100 may comprise a flexible portion 120, receiving portion 122 of the flexible portion 120, leg holes 124, an underbelly opening 126, a connection element 128 of the flexible portion 120, and a suspension structure 130. Suspension structures 130 couple the sling 119 with the raised structure 101 at a crossbeam 108, such that the sling 119 is suspended above the ground or floor. A suspension structure 130 may be a string, adhesive, clips, or any other means of coupling the sling 119 with the raised structure 101.

Figure 2:
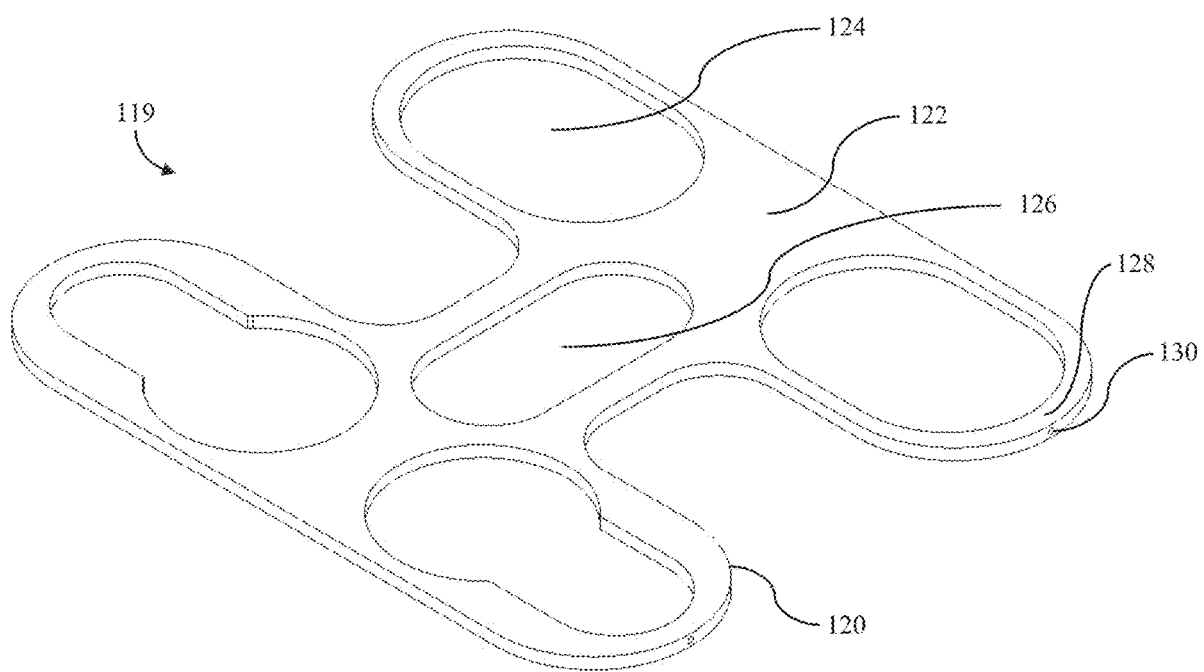
FIG. 2 shows a perspective view of a sling of a cat suspension and training apparatus.

FIG. 2 depicts a perspective view of a sling of a cat suspension and training apparatus 100. A number of elements depicted in FIG. 2 are described above in the context of FIG. 1 and those descriptions apply similarly to the same elements depicted in FIG. 2 and elsewhere. As illustrated, the flexible portion 120 of the sling 119 comprises a receiving portion 122, leg holes 124, an underbelly opening 126, and connection element 128, with at least one suspension structure 130 coupling the sling 119 with the raised structure 101. The receiving portion 122 is configured to align with and interface with an underbelly region of a cat when a cat is lowered into the sling 119. The sling 119 may comprise less than four, four, or more than four leg holes 124, positioned on the front-right, front-left, rear-right, and rear-left regions of the flexible portion 120 to align with and accept four legs of a cat.

An underbelly opening 126 is positioned substantially in the center of the flexible portion 120 to align with an underbelly region of a cat. The underbelly opening 126 may be any size or shape, depending on the use of the apparatus 100. For example, if the apparatus 100 is being used as a bathing tool, the underbelly opening 126 should be large to maximize exposed surface area of a suspended cat. To prevent a cat's leg from accidentally aligning with and entering an underbelly opening 126 when being lowered into the apparatus 100, the underbelly opening 126 may interface with and be covered with a removable flap or cover. The removable flap or cover may be coupled with the flexible portion 120 with any means of quick attachment and removal, such as hook and loops, ties, non-permanent adhesive, magnets, or any other means of quick attachment and removal of a cover or flap. This quick attachment mechanism of the flexible portion around a cat as a cat is lowered or dropped into the sling 119 is intended to provide a safer environment for both human handler and cat. In the embodiment described, the harness attaches to itself, either manually or automatically, to secure the cat upon a weight in the sling 119. In this example, the sling is not secured around the cat in a step prior to suspending the cat, instead these functions are both accomplished in one step.

In another embodiment, other regions or sections of the sling 119 may be removably detached, in addition to an underbelly opening 126, to allow access to the entirety of a cat's body for bathing, grooming, veterinary care, radiology, or other types of cat interaction that may require access to any and all regions of a cat's body. For example, there may be a removable flap or portion on the side of the sling 119, not centered on the underbelly of the cat. In some embodiments, the sling material itself may allow access to the body of the cat, such as a mesh material, wire material, repositionable thread materials, or any other material with readily positionable gaps or openings that allow direct access to specific regions of the cat's body.

In a further embodiment, additional portions or segments may be attached to the sling 119 or on other regions of the cat. For example, during radiology, the sling may have additional lead-based attachments for protecting the cat's body from radiation. These attachable sections may attach overtop of the sling 119, adjacent to the sling 119, or on other regions of the cat's body that are not in contact with the sling 119, such as the legs of the cat. As another example, lead-based attachments may wrap around one or more legs of the cat to protect a cat's leg from radiation during an x-ray or other radiation-based procedure.

A connection element 128 of the flexible portion 120 enables the sling 119 to couple to itself at two or more connection elements 128 when a cat is lowered into or suspended over in the receiving portion 122 of the sling 119. This coupling may involve little to no effort to ensure quick and secure fastening of the sling 119 around the body of the cat upon placing the cat in the sling 119. For example, the connection elements 128 may comprise magnets, hook and loop attachments, ties, non-permanent adhesive, a combination, or any other means of quickly and securely attaching two or more connection elements 128 together when a cat is lowered into, or suspended in the sling 119.

As another example, the suspension structures 130 may be positioned in a variety of locations to reposition the sling 119 with respect to the raised structure 101. For example, the suspension structure 130 may attach to various regions around the exterior of the leg holes 124 of the sling 119 to allow the cat's weight to be repositioned in the sling in a forward and backward direction. In another example, the suspension structures 130 may be removably attached to the sling 119 so that the suspension structures 130 may be adjusted after the cat is in the sling 119. As an example, the suspension structure 130 may be detachably coupled to the underbelly region of the sling 119. There may be more than four suspension structures which may or may not all be coupled to the sling 119 at the same time.

In an example, four suspension structures 130 may be used up until the time a cat is secured in the sling 119. After the cat is secured in the sling 119, the suspension structures 130 may be adjusted to couple with the underbelly region of the sling 119, or alternatively couple with another suspension structure 130 so that the suspension structures 130 form at least one loop around the sling 119 holding the cat. At which point, the four original suspension structures may be removed, allowing rotation of the sling 119 to hold the sling 119 upside down with the cat inside. In this example, the sling may have semi-rigid or stiff spinal supports that support the cat adjacent to, near, or parallel to, the spine of the cat to prevent excess strain on a cat's back when a cat is rotated to be held upside down in the cat suspension and training apparatus 100. This example may be used during radiology when cats are often exposed to radiation upside down, with the stomach exposed. In this example, the use of this apparatus may allow a radiologist to perform various treatments or method without having to completely sedate a cat, and thus may reduce medical costs and animal stress.

Additionally, the cat suspension and training apparatus 100 may have a head support structure that is a part of, or separate from, the sling 119. The head support structure may have a material that holds the weight of a cat's head under the mylohyoid. This may prevent a cat's head and neck from hanging directly downward when resting in the sling and reduce stress on the cat's neck to hold its head upright while hanging in the sling 119. The material of the head support structure may be a variety of materials, including but not limited to the material of the sling 119. Head support structures may hold the head support structure in place by connecting to the head support structure and the sling 119 or other region of the cat suspension and training apparatus 100. The head support structure may or may not be connected to the sling 119 by head support connectors that hold the head support structure in place from below. Additionally or alternatively, the head support structure may be held in place from support connectors below, stemming from the base of the raised structure 101, or from the crossbeams above, such as crossbeam 108, of the raised structure 101.

The shape and size of the sling 119 may be of a variety of different shapes and sizes to accommodate a variety of cat ages, types, sizes, and medical diagnoses. For example, the shape of the sling for a pregnant cat may have a large opening in the underbelly region, larger than the underbelly opening 126, to prevent discomfort of pressure on the belly of a pregnant cat and also allow for a difference in shape and anatomy. Additionally, the sling may be a variety of lengths, depending on the size of the cat, and may be adjustable in multiple directions in the receiving portion 122 by any means of tightening and loosening the material to adjust the length and width of the sling 119.

Figure 3:
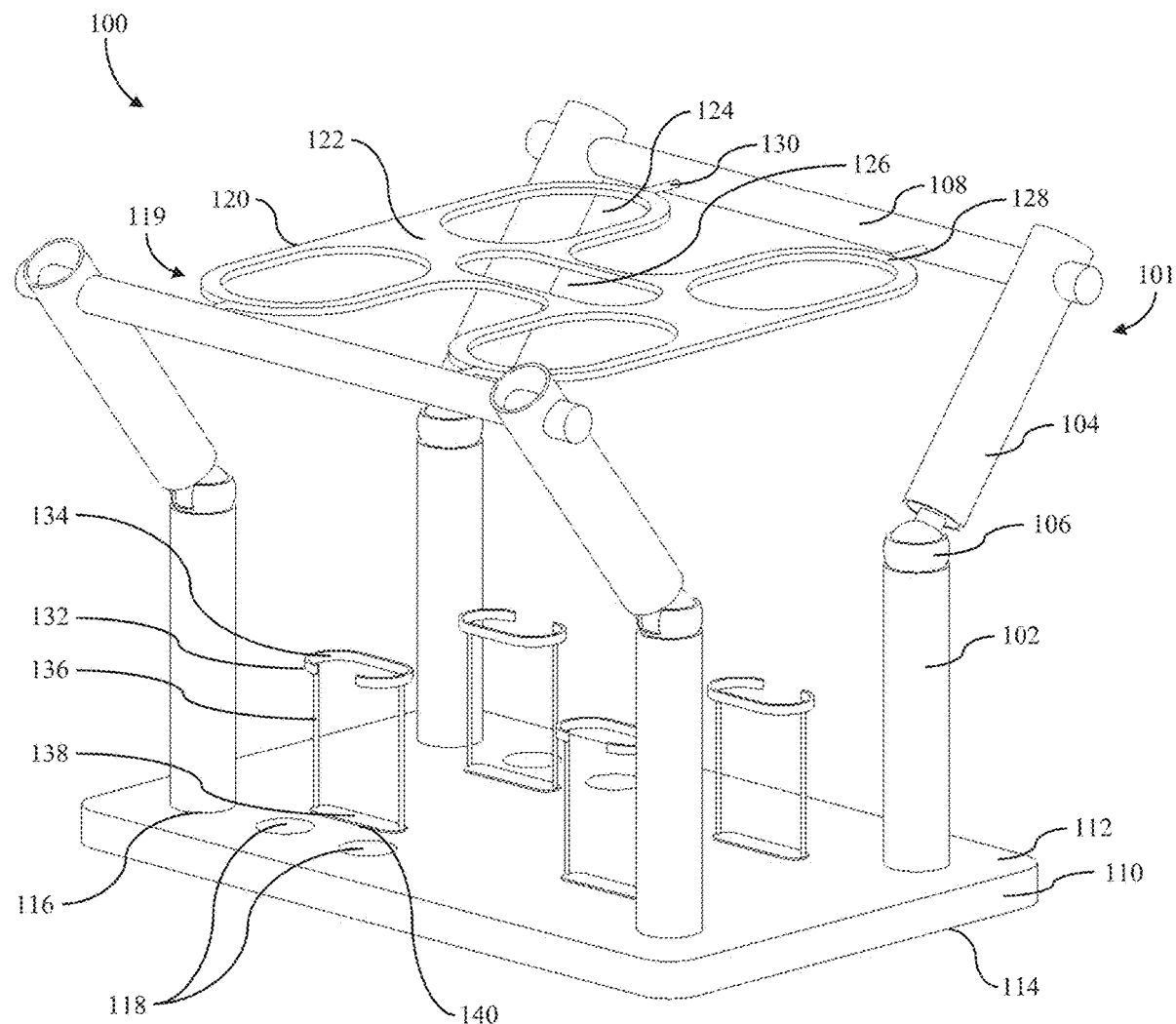
FIG. 3 shows a perspective view of another cat suspension and training apparatus in a receiving configuration.

FIG. 3 shows a perspective view of another cat suspension and training apparatus 100 in a receiving configuration. A number of elements depicted in FIG. 3 are described above in the context of FIG. 1 and, thus, are not necessarily described further. The apparatus 100 may additionally comprise at least one limb security strap 132. The limb security strap 132 comprises a releasable metacarpal strap 134, a connection line 136, a releasable base attachment 138, and a releasable base attachment mechanism 140. The releasable metacarpal strap 134 is positioned to loop around the metacarpal region of a cat and has an adjustable circumference to easily fit over a foot of a cat and thereafter be tightened, e.g. manually, around the metacarpal region. The connection line 136 is coupled to both the releasable metacarpal strap 134 and the releasable base attachment 138. There may be a plurality of connection lines 136 for each limb security strap 132. Additionally, the connection line 136 is adjustable in length and may also be elastic to ensure that the metacarpal strap 134 can reach the metacarpal region of a cat when the releasable base attachment 138 is coupled with the top face 112 of the base 110 to accommodate varying heights of cats and varying height and width settings of the raised structure 101. The releasable base attachment mechanism 140 removably couples the releasable base attachment 138 with the top face 112 of the base 110. Alternatively, the base attachment 138 may be the same as the base attachment mechanism 140 such that the connection line 136 ends in a base attachment mechanism 140. As an example, the releasable base attachment mechanism may be a screw, nail, tack, non-permanent adhesive, clamp, or any other means of removably adhering a limb security strap 132 to the top face 112 of the base 110, to allow for easy repositioning of the limb security strap 132 to accommodate for the varying placement of a cat in the sling 119.

Figure 4:
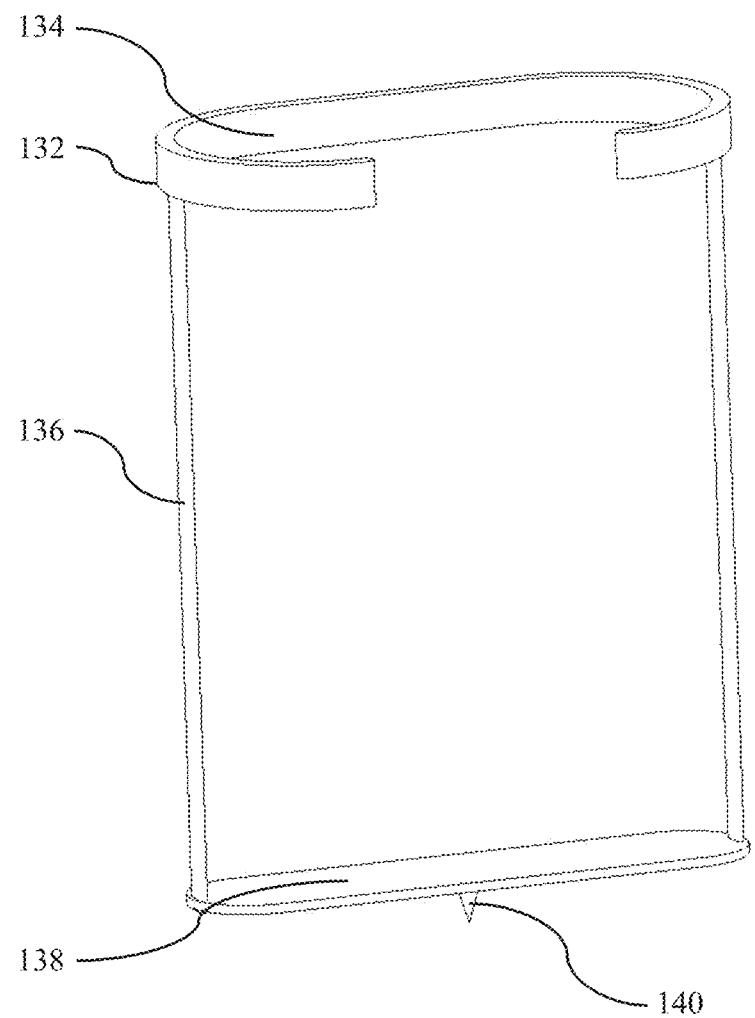
FIG. 4 shows a perspective view of a limb security strap of a cat suspension and training apparatus in a receiving configuration.

FIG. 4 shows a perspective view of a limb security strap of a cat suspension and training apparatus 100 in a receiving configuration. A number of elements depicted in FIG. 4 are described above in the context of FIG. 3 and, thus, are not necessarily described further. In addition to the above mentioned features and capabilities of the limb security strap 132, the metacarpal strap 134 may have a receiving configuration and a closed configuration. The receiving configuration of the metacarpal strap 134 enables easy access of the strap to the metacarpal region of a cat to then enable tightening of the strap to a closed configuration around the metacarpal region of a cat, preventing or limiting range of motion of a cat's leg that is secured by the limb security strap 132.

Figure 5:
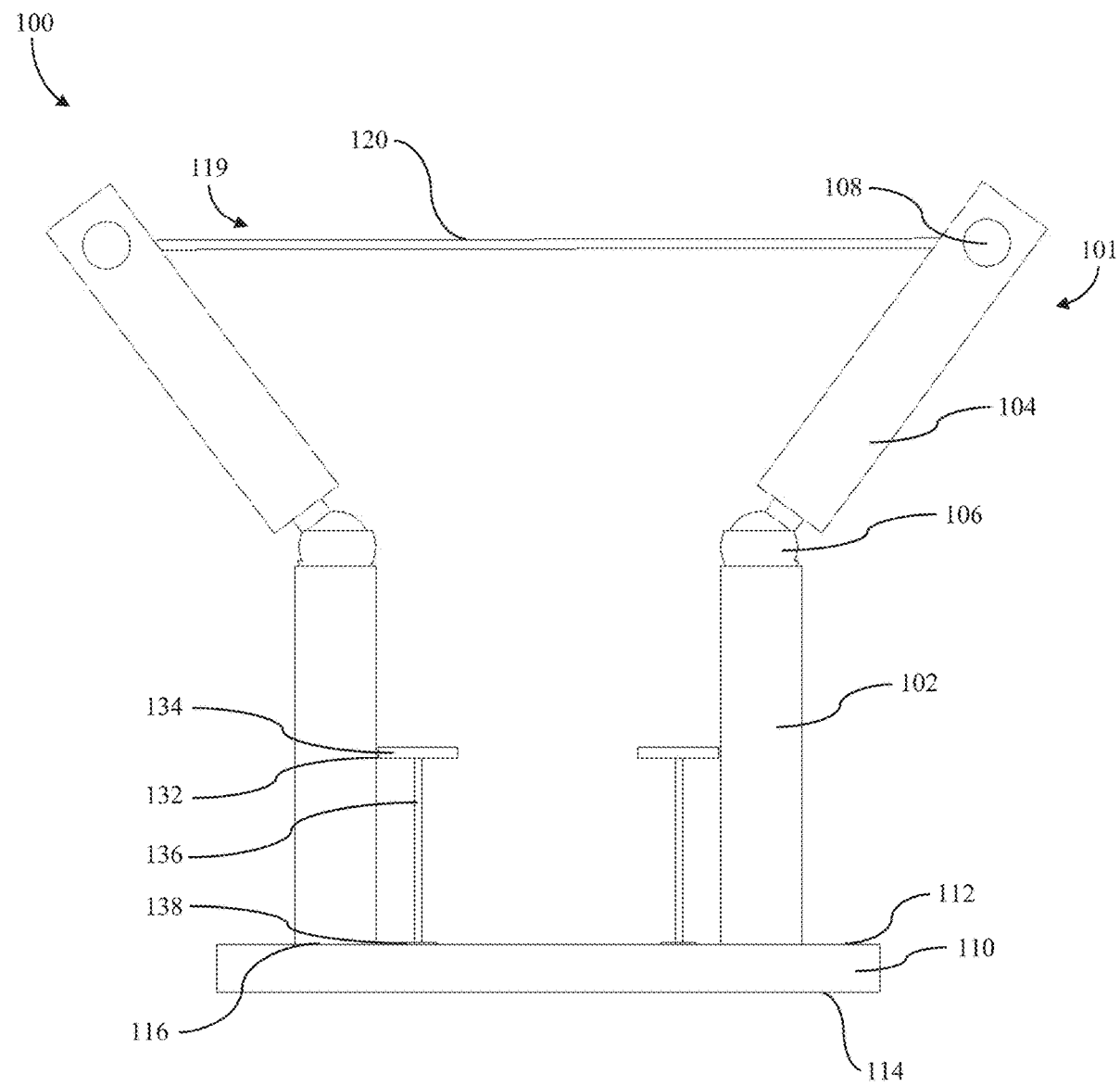
FIG. 5 shows a front view of the cat suspension and training apparatus of FIG. 3 in a receiving configuration.

FIG. 5 shows a front view of the cat suspension and training apparatus 100 of FIG. 3, in a receiving configuration. A number of elements depicted in FIG. 5 are described above in the context of FIG. 3 and, thus, are not necessarily described further. Although FIG. 5 shows a receiving configuration of the apparatus 100, the sling 119 may or may not be fully taut in the receiving configuration. The receiving configuration enables a cat to be easily aligned with, and lowered into, a sling 119 without entanglement or misalignment. Thus, the receiving configuration involves positioning the sling 119 to allow ease of cat alignment and securement, which does not involve a complete spreading of the sling 119 but instead only a partial spreading may be involved, according to some embodiments. Correspondingly, the configuration transitioning joint 106 may have a range of angles that would allow the apparatus 100 to be in the receiving configuration.

Figure 6:
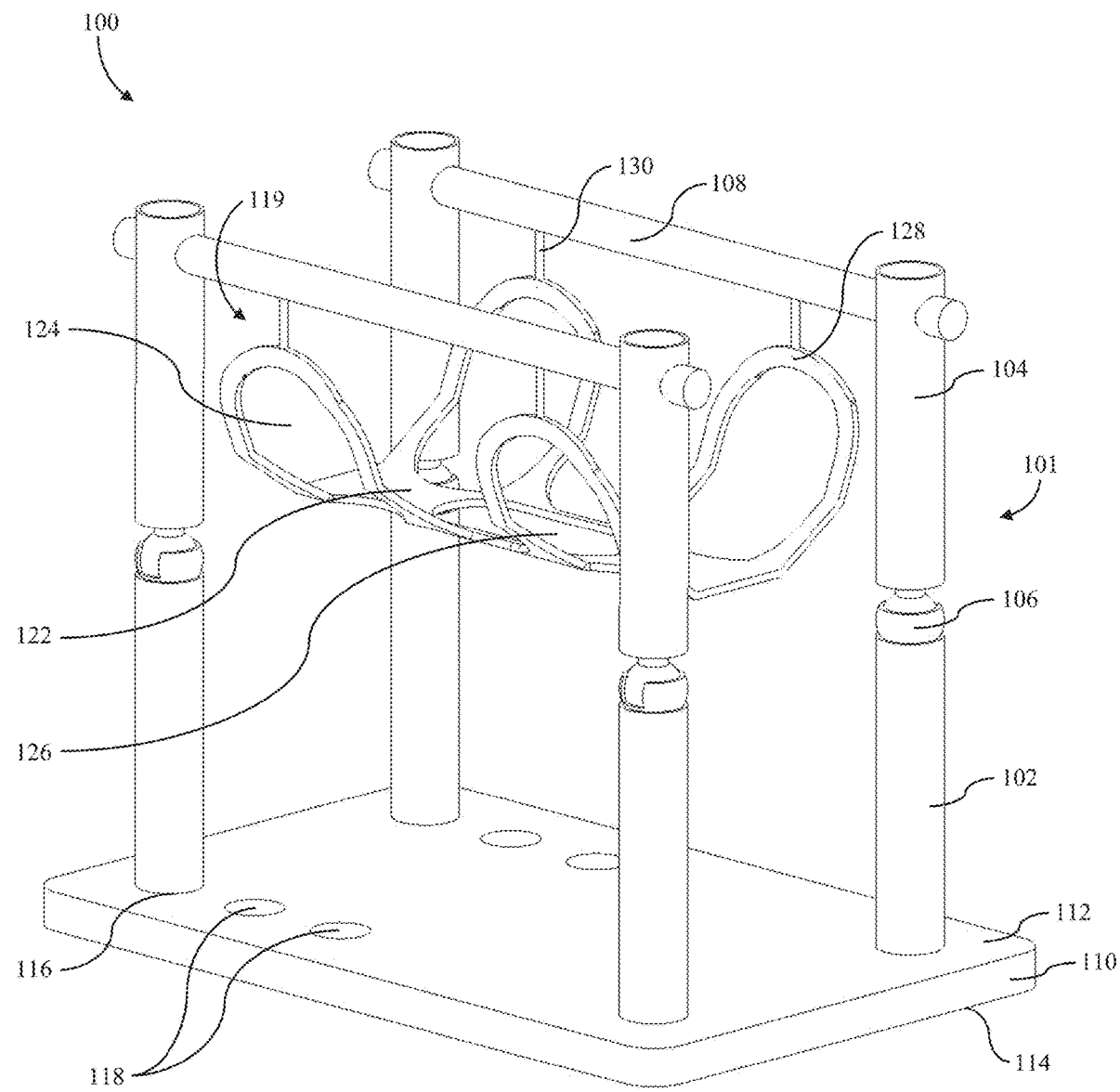
FIG. 6 shows a perspective view of the cat suspension and training apparatus of FIG. 1 in a resting configuration.

FIG. 6 shows a perspective view of the cat suspension and training apparatus 100 of FIG. 1, in a resting configuration. A number of elements depicted in FIG. 6 are described above in the context of FIG. 1 and, thus, are not necessarily described further. In this example, the four support legs of the apparatus 100 are vertically positioned, with the configuration transitioning joint 106 providing no angle between the bottom support rod 102 and the top support rod 104, with and no connection element 128 being attached to any other connection element 128.

Figure 7:
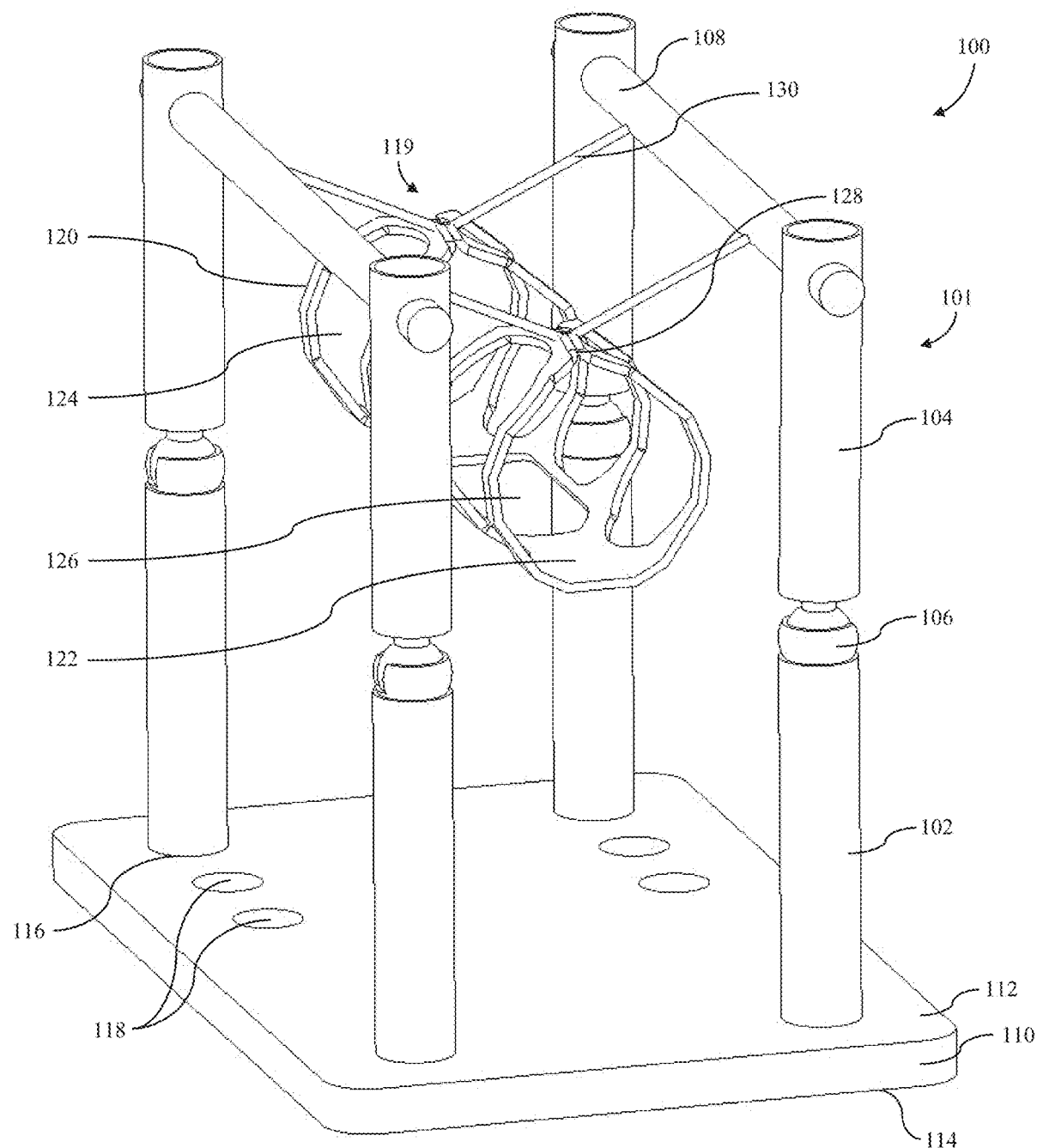
FIG. 7 shows a perspective view of the cat suspension and training apparatus of FIG. 1 in a closed configuration.

FIG. 7 shows a perspective view of the cat suspension and training apparatus 100 of FIG. 1, in a closed configuration. A number of elements depicted in FIG. 6 are described above in the context of FIG. 1 and, thus, are not necessarily described further. In this example, the four support legs of the apparatus 100 are vertically positioned, with the configuration transitioning joint 106 providing no angle between the bottom support rod 102 and the top support rod 104. However, FIG. 7 depicts a closed configuration of an example of the apparatus 100 because at least one connection element 128 is coupled with another connection element 128, thus enabling securing a cat in the sling 119.

Figure 8:
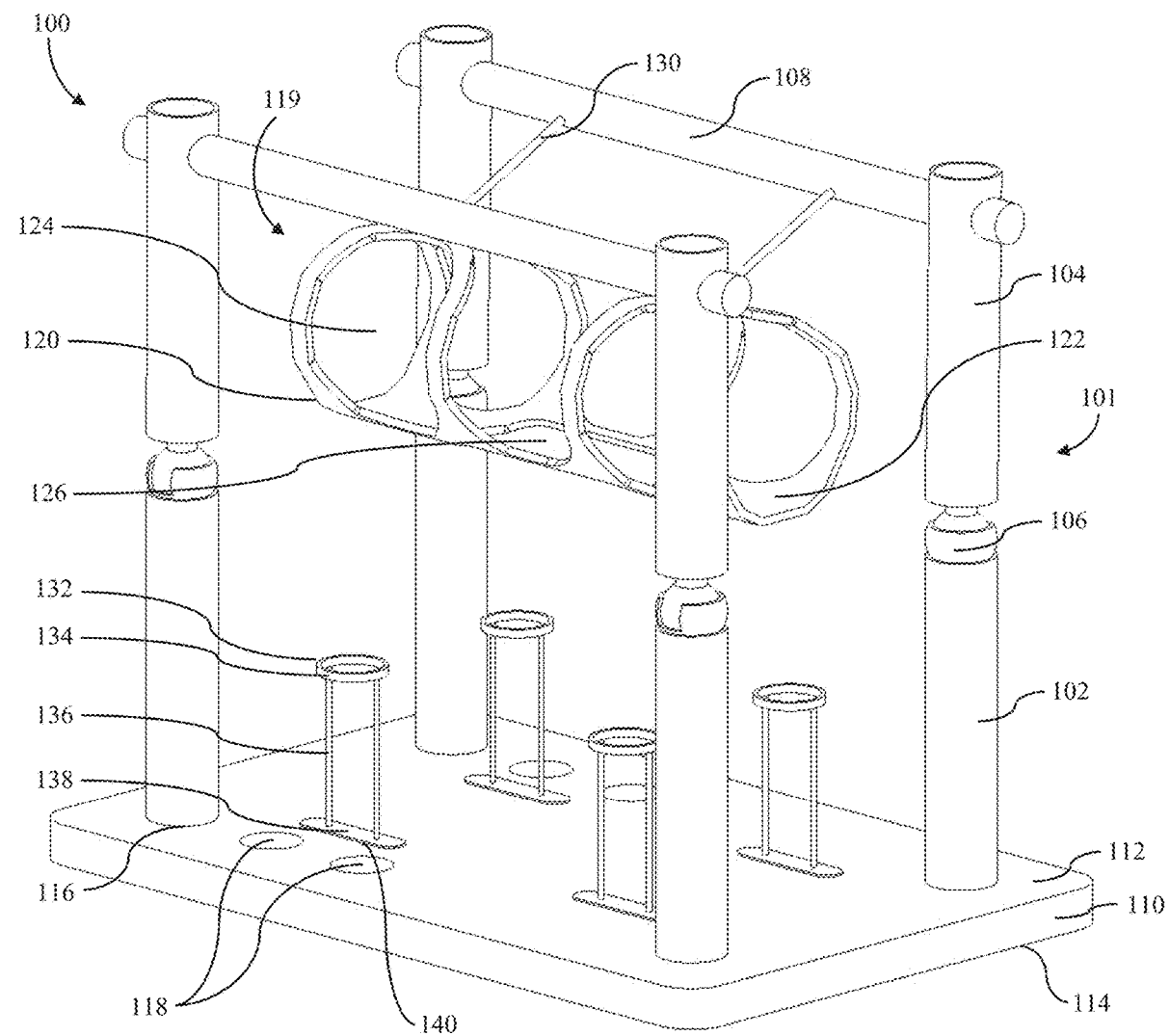
FIG. 8 shows a perspective view of the cat suspension and training apparatus of FIG. 3 in a closed configuration.

FIG. 8 shows a perspective view of the cat suspension and training apparatus 100 of FIG. 3, in a closed configuration. A number of elements depicted in FIG. 8 are described above in the context of FIG. 7 and, thus, are not necessarily described further. A number of elements depicted in FIG. 8 are described above in the context of FIG. 4 and, thus, are not necessarily described further. In addition to the above mentioned features and capabilities of the limb security strap 132, the metacarpal strap 134 may have a closed configuration. The closed configuration of the metacarpal strap 134 forms a loop around the metacarpal region tight enough to prevent a cat from sliding the secured limb out of the metacarpal strap 134, thus preventing or limiting range of motion of a cat's leg that is secured by the limb security strap 132. The tightness of the metacarpal strap 132 may be adjusted by bending, hooks and loops, clasp, ties, or any other means of tightening a loop around a metacarpal region.

Figure 9:
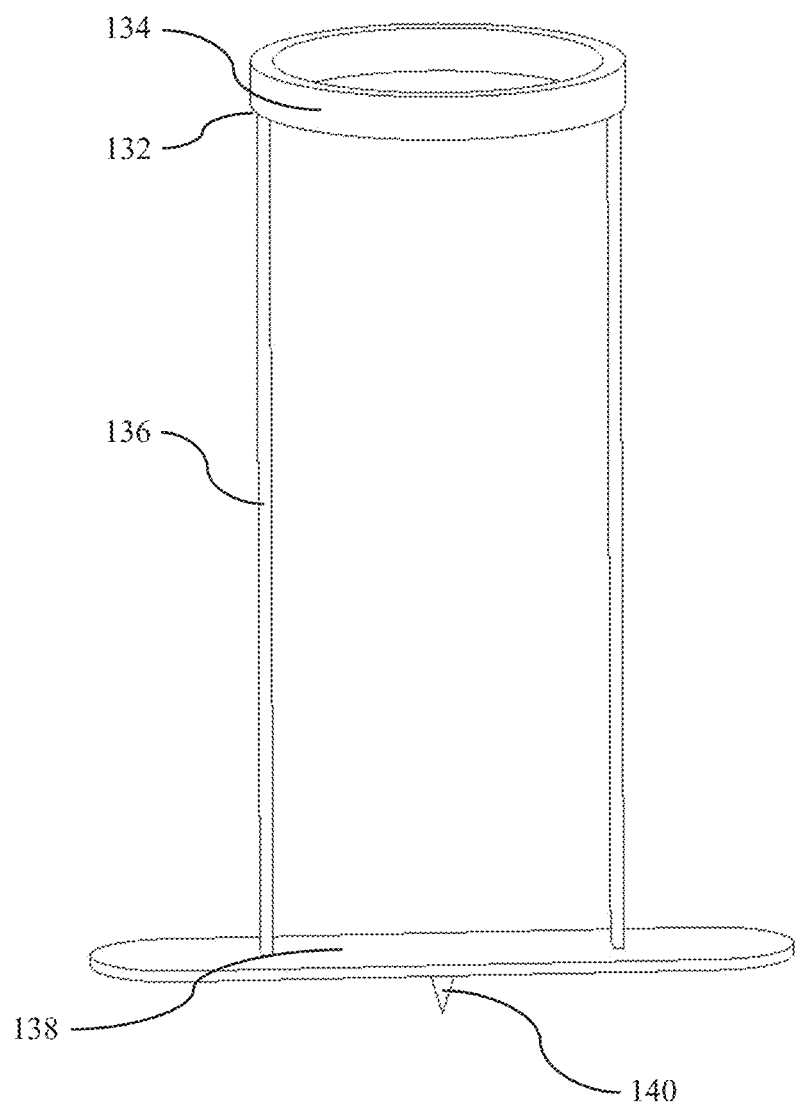
FIG. 9 shows a perspective view of the limb security strap of FIG. 4 in a closed configuration.

FIG. 9 shows a perspective view of the limb security strap 132 of a cat suspension and training apparatus 100 in a closed configuration. A number of elements depicted in FIG. 8 are described above in the context of FIG. 4 and FIG. 8 and, thus, are not necessarily described further.

Figure 10:
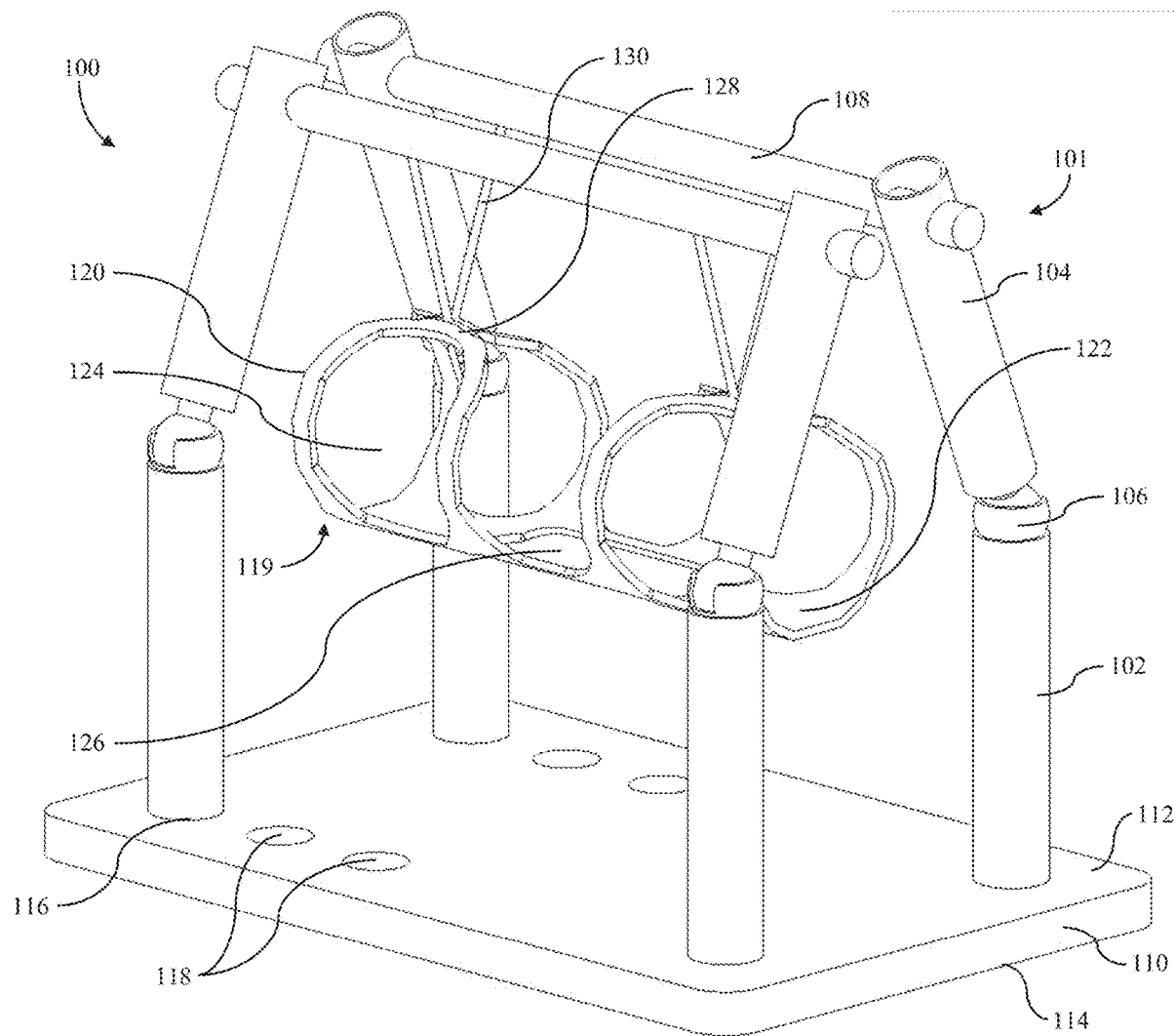
FIG. 10 shows a perspective view of the cat suspension and training apparatus in a closed configuration.

FIG. 10 shows a perspective view of the cat suspension and training apparatus 100 in a closed configuration. A number of elements depicted in FIG. 10 are described above in the context of FIG. 7 and, thus, are not necessarily described further. In this example, the four support legs of the apparatus 100 are angled inward, with the configuration transitioning joint 106 positioning the crossbeams 108 proximately closer to each other than when the support legs are positioned vertically. A closed configuration of an example of the apparatus 100 is depicted here because at least one connection element 128 is coupled with another connection element 128, thus enabling securing a cat in the sling 119. Additionally, the inward angle defined by the bottom support rod 102 and the top support rod 104 allow for easier and faster cat securement because the inward angle allows the connection elements 128 and suspension structures 130 to be in closer proximity to each other prior to attachment.

Figure 11:
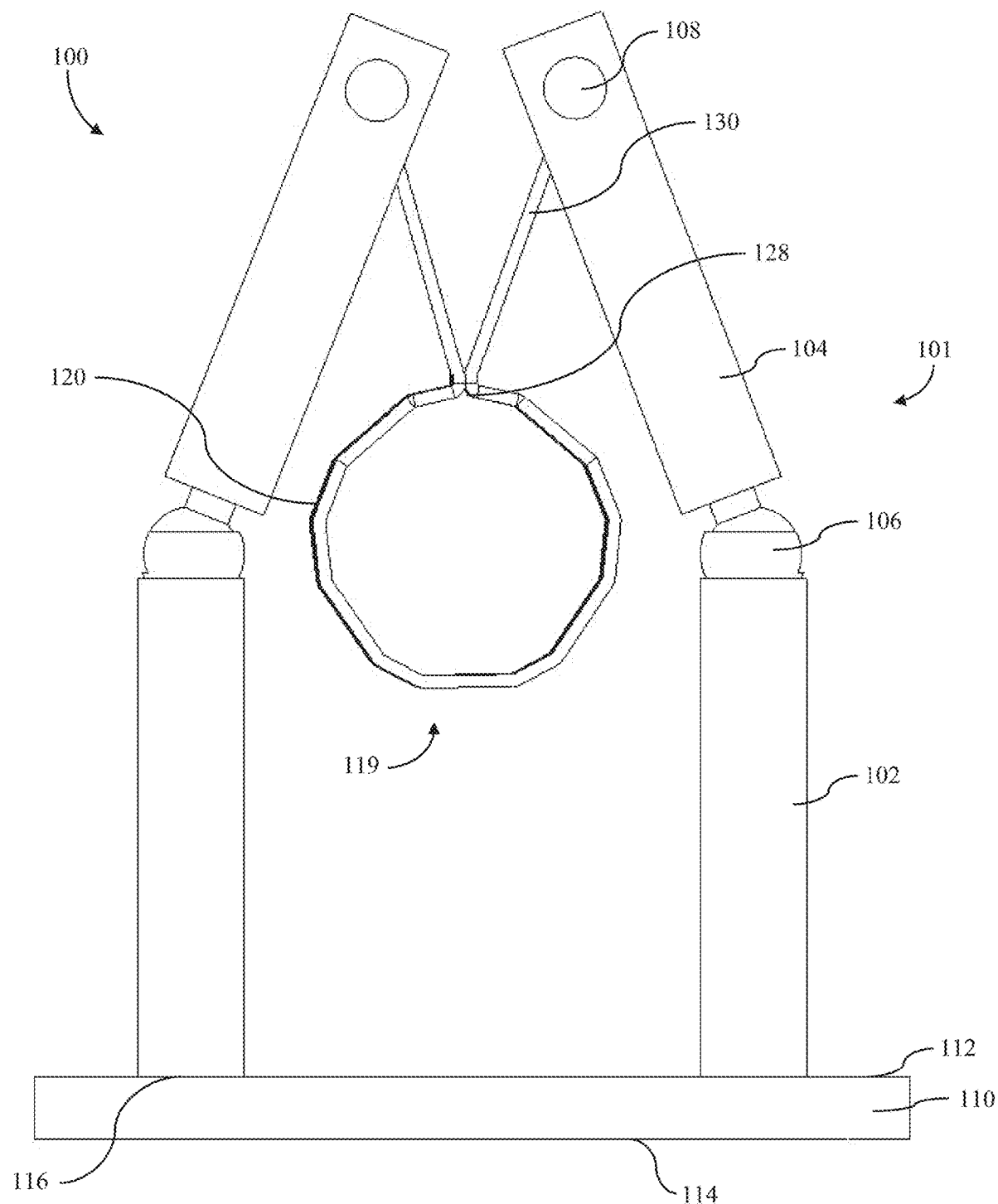
FIG. 11 shows a front elevation view of the cat suspension and training apparatus of FIG. 10 in the closed configuration.

FIG. 11 shows a front elevation view of the cat suspension and training apparatus 100 of FIG. 10, in a closed configuration. A number of elements depicted in FIG. 11 are described above in the context of FIG. 10 and, thus, are not necessarily described further.

Figure 12:
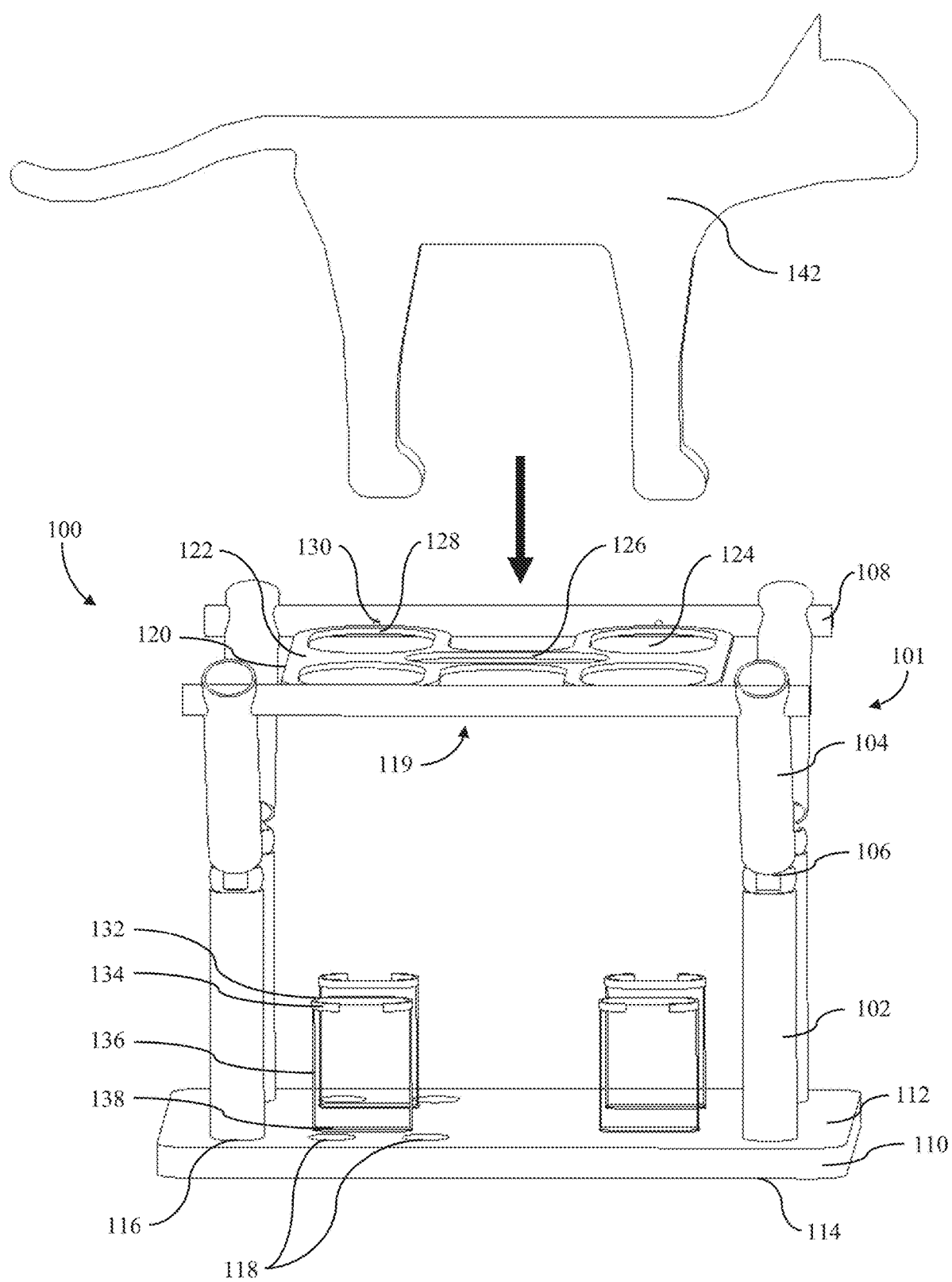
FIG. 12 shows a side view of the cat suspension and training apparatus of FIG. 3 in a receiving configuration with a cat aligned with a receiving portion of a sling.

FIG. 12 shows a side view of the cat suspension and training apparatus 100 of FIG. 3, in a receiving configuration with a cat aligned with a receiving portion of a sling. As previously described, the receiving configuration of the apparatus 100 enables a cat 142 to be easily aligned with, and lowered into, a sling 119 without entanglement or misalignment.

Figure 13:
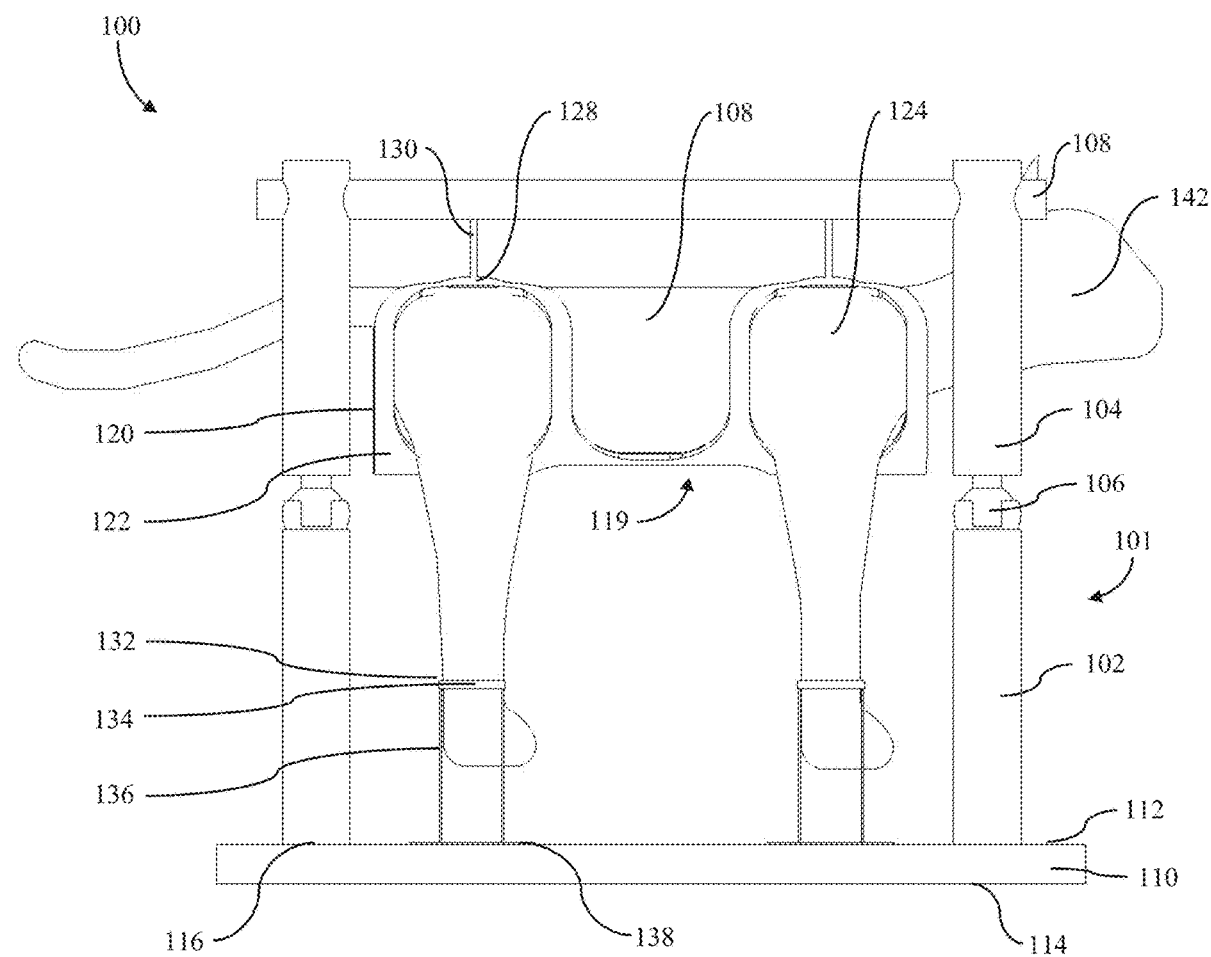
FIG. 13 shows a side elevation view of the cat suspension and training apparatus of FIG. 12 in a closed configuration with a cat suspended in a receiving portion of a sling.

FIG. 13 shows a side elevation view of the cat suspension and training apparatus 100 of FIG. 12, in a closed configuration with a cat suspended in a receiving portion of a sling. A number of elements depicted in FIG. 13 are described above in the context of FIG. 12 and, thus, are not necessarily described further. As previously described, the closed configuration of the apparatus 100 secures, suspends, and immobilizes a cat 142 in a sling 119 by at least securely coupling two or more connection elements 128 such that the sling 119 is secured around the body of the suspended cat 142.

Figure 14:
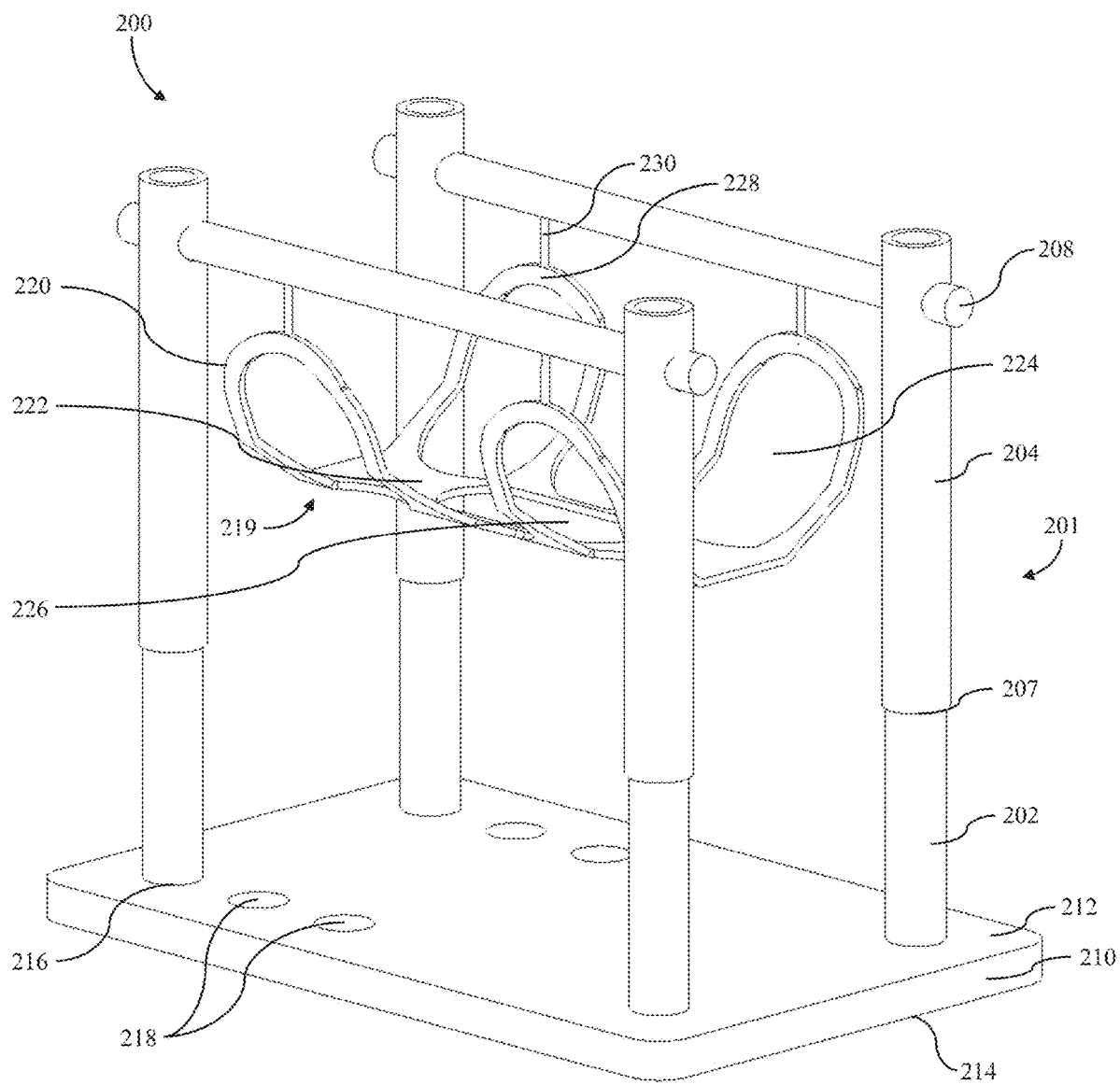
FIG. 14 shows a perspective view of a cat suspension and training apparatus in a resting configuration with an alternative adjustment mechanism for a raised structure.

FIG. 14 shows a perspective view of a cat suspension and training apparatus 200 in a resting configuration with an alternative adjustment mechanism for a raised structure 201. In some examples, the apparatus 200 may comprise at least two components, a raised structure 201 and a sling 219. The raised structure 201 is positioned and configured to suspend the sling 219 above the ground or floor. As an example, the raised structure 201 may comprise a base 210, bottom support rods 202, top support rods 204, height adjustment joints 207 and crossbeams 208.

The bottom support rods 202 may engage with the base 210 at a support rod connection interface 216 of the base 210. Bottom support rods 202 may be hollow or solid or a combination thereof. Additionally, the bottom support rods 202 may allow for drainage through the base 210 at or along the support rod connection interface 216 to prevent perpetually wet or unaerated interiors of the bottom support rods 202. From the support rod connection interface 216, a bottom support rod 202 may extend from the base a bottom support rod distance, upward. One end of the bottom support rod 202, the end opposite a support rod connection interface 216, the bottom support rod 202 may interface with a height adjustment joint 207. The height adjustment joint 207 may be a twist-to-lock, slideable friction-fit, resilient button with snap-locking, or similar mechanism, e.g. manual, automatic, or battery-powered height adjustment of the raised structure 201. Alternatively, height adjustments may be made by adjusting the length of a suspension structure 230, repositioning a crossbeam 208 to a lower position on a support leg, adjusting the height of the base 210, or similar vertical repositioning of the raised structure 201 components.

The top support rods 204 may be coupled with the height adjustment joint 207 on a side of the height adjustment joint 207 substantially opposite of the point of connection between the bottom support rod 202 and the height adjustment joint 207. The top support rods 204 may extend from the height adjustment joint 207 a top support rod distance, upward. There may exist at least four support legs (comprising a bottom support rod 202, height adjustment joint 207 and top support rod 204). Additionally, the raised structure 201 may comprise a crossbeam 208 positioned between two support legs of the raised structure 201, coupled to the support legs substantially near the end of the top support rod 204 substantially opposite the end coupled with the height adjustment joint 207. The crossbeams 208 may be removably or permanently coupled to the top support rods 204, for example by rod-and-hole friction interfacing, integration into one material, or any other removable or permanent interfacing combination. In another example, the raised structure 201 may comprise at least two crossbeams 208 configured substantially parallel to each other, each on right and left sides of the raised structure 201.

A base 210 of the raised structure 201 may comprise a top face 212 and bottom attachment face 214 of the base 210. Although the base may be constructed with a wide variety of materials, hard materials will more easily prevent a cat's claw from being able to sink into and adhere to the base 210, thus undermining the effectiveness of the cat immobilization apparatus 200 through suspension. The bottom attachment face 214 may be configured to removably engage a ground surface or floor surface, thus stabilizing the apparatus 200 via the raised structure 201. The bottom attachment face 214 may be made of an adhering material, such as rubber, sticky tack, or a non-permanent adhesive paint or coating, or any other adhering or frictionally-engaging material, or alternatively, may comprise removable floor- or ground-coupling devices, such as suction cups, tacks, clamps, or any other means of coupling the bottom attachment face 214 with a ground or floor surface. The top face 212 of the base 210 may comprise a support rod connection interface 216, enabling a bottom support rod 202 to be coupled with the base 210. The support rod connection interface 216 may comprise any of a variety of ways to easily couple components for easy disassembly, for example a friction fit, screw tightening, slide and lock, or any other means of removably coupling the bottom support rod 202 with the top face 212 of the base 210 at a support rod connection interface 216. In a further example, the top face 212 of the base 210 may comprise a plurality of optional locational placements for a support rod connection interface 216, thus including support rod width adjustment interfaces 218 of the base 210. The support rod width adjustment interfaces 218 may be configured as a pre-distanced set of support rod connection interfaces 216 positioned varying widths apart such that the support legs may be closer or further apart. Allowing for varying width adjustments will ensure that the raised structure 201 is configured for the size of the cat, as cats come in all sizes. Alternatively, to a pre-distanced set of support rod interfaces 216, one or more of the support legs may be slideable, or uniquely and independently adjustable about the base 210. The rod width adjustment interfaces 218 may allow for frontal, lateral, or diagonal support leg adjustment about the base 210.

A sling 219 of a cat suspension and training apparatus 200 may comprise a flexible portion 220, receiving portion 222 of the flexible portion 220, leg holes 224, an underbelly opening 226, a connection element 228 of the flexible portion 220, and a suspension structure 230. Suspension structures 230 couple the sling 219 with the raised structure 201 at a crossbeam 208, such that the sling 219 is suspended above the ground or floor. A suspension structure 230 may be a string, adhesive, clips, or any other means of coupling the sling 219 with the raised structure 201.

Figure 15:
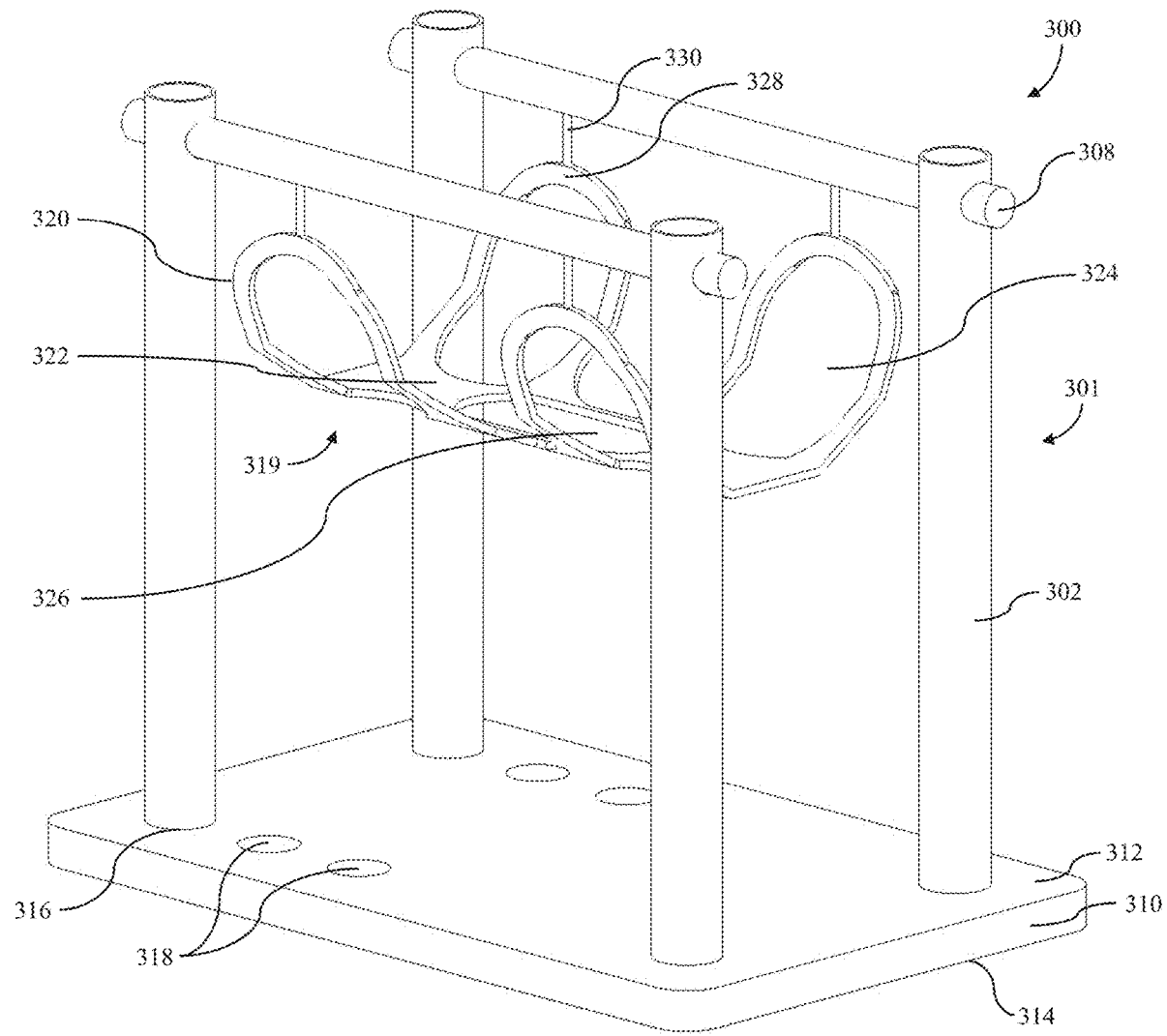
FIG. 15 shows a perspective view of a cat suspension and training apparatus in a resting configuration without the height adjustment mechanism of FIG. 14.

FIG. 15 shows a perspective view of a cat suspension and training apparatus 300 in a resting configuration without the height adjustment mechanism of FIG. 14. In some examples, the apparatus 300 may comprise at least two components, a raised structure 301 and a sling 319. The raised structure 301 is positioned and configured to suspend the sling 319 above the ground or floor. As an example, the raised structure 301 may comprise a base 310, support rods 302, and crossbeams 308.

The support rods 302 may engage with the base 310 at a support rod connection interface 316 of the base 310. Support rods 302 may be hollow or solid or a combination thereof. Additionally, the support rods 302 may allow for drainage through the base 310 at or along the support rod connection interface 316 to prevent perpetually wet or unaerated interiors of the support rods 302. From the support rod connection interface 316, a support rod 302 may extend from the base a support rod distance, upward.

Additionally, the raised structure 301 may comprise a crossbeam 308 positioned between two support rods 302, coupled to the support rods 302 substantially near the end of the support rod 302 substantially opposite the end coupled with the support rod connection interface 316. The crossbeams 308 may be removably or permanently coupled to the support rods 302, for example by rod-and-hole friction interfacing, integration into one material, or any other removable or permanent interfacing combination. In another example, the raised structure 301 may comprise at least two crossbeams 308 configured substantially parallel to each other, each on right and left sides of the raised structure 301.

A base 310 of the raised structure 301 may comprise a top face 312 and bottom attachment face 314 of the base 310. Although the base may be constructed with a wide variety of materials, hard materials will more easily prevent a cat's claw from being able to sink into and adhere to the base 310, thus undermining the effectiveness of the cat immobilization apparatus 300 through suspension. The bottom attachment face 314 may be configured to removably engage a ground surface or floor surface, thus stabilizing the apparatus 300 via the raised structure 301. The bottom attachment face 314 may be made of an adhering material, such as rubber, sticky tack, or a non-permanent adhesive paint or coating, or any other adhering or frictionally-engaging material, or alternatively, may comprise removable floor- or ground-coupling devices, such as suction cups, tacks, clamps, or any other means of coupling the bottom attachment face 314 with a ground or floor surface. The top face 312 of the base 310 may comprise a support rod connection interface 316, enabling a support rod 302 to be coupled with the base 310. The support rod connection interface 316 may comprise any of a variety of ways to easily couple components for easy disassembly, for example a friction fit, screw tightening, slide and lock, or any other means of removably coupling the support rod 302 with the top face 312 of the base 310 at a support rod connection interface 316. In a further example, the top face 312 of the base 310 may comprise a plurality of optional locational placements for a support rod connection interface 316, thus including support rod width adjustment interfaces 318 of the base 310. The support rod width adjustment interfaces 318 may be configured as a pre-distanced set of support rod connection interfaces 316 positioned varying widths apart such that the support legs may be closer or further apart. Allowing for varying width adjustments will ensure that the raised structure 301 is configured for the size of the cat, as cats come in all sizes. Alternatively, to a pre-distanced set of support rod interfaces 316, one or more of the support legs may be slideable, or uniquely and independently adjustable about the base 310. The rod width adjustment interfaces 318 may allow for frontal, lateral, or diagonal support leg adjustment about the base 310.

A sling 319 of a cat suspension and training apparatus 300 may comprise a flexible portion 320, receiving portion 322 of the flexible portion 320, leg holes 324, an underbelly opening 326, a connection element 328 of the flexible portion 320, and a suspension structure 330. Suspension structures 330 couple the sling 319 with the raised structure 301 at a crossbeam 308, such that the sling 319 is suspended above the ground or floor. A suspension structure 330 may be a string, adhesive, clips, or any other means of coupling the sling 319 with the raised structure 301.

Figure 16:
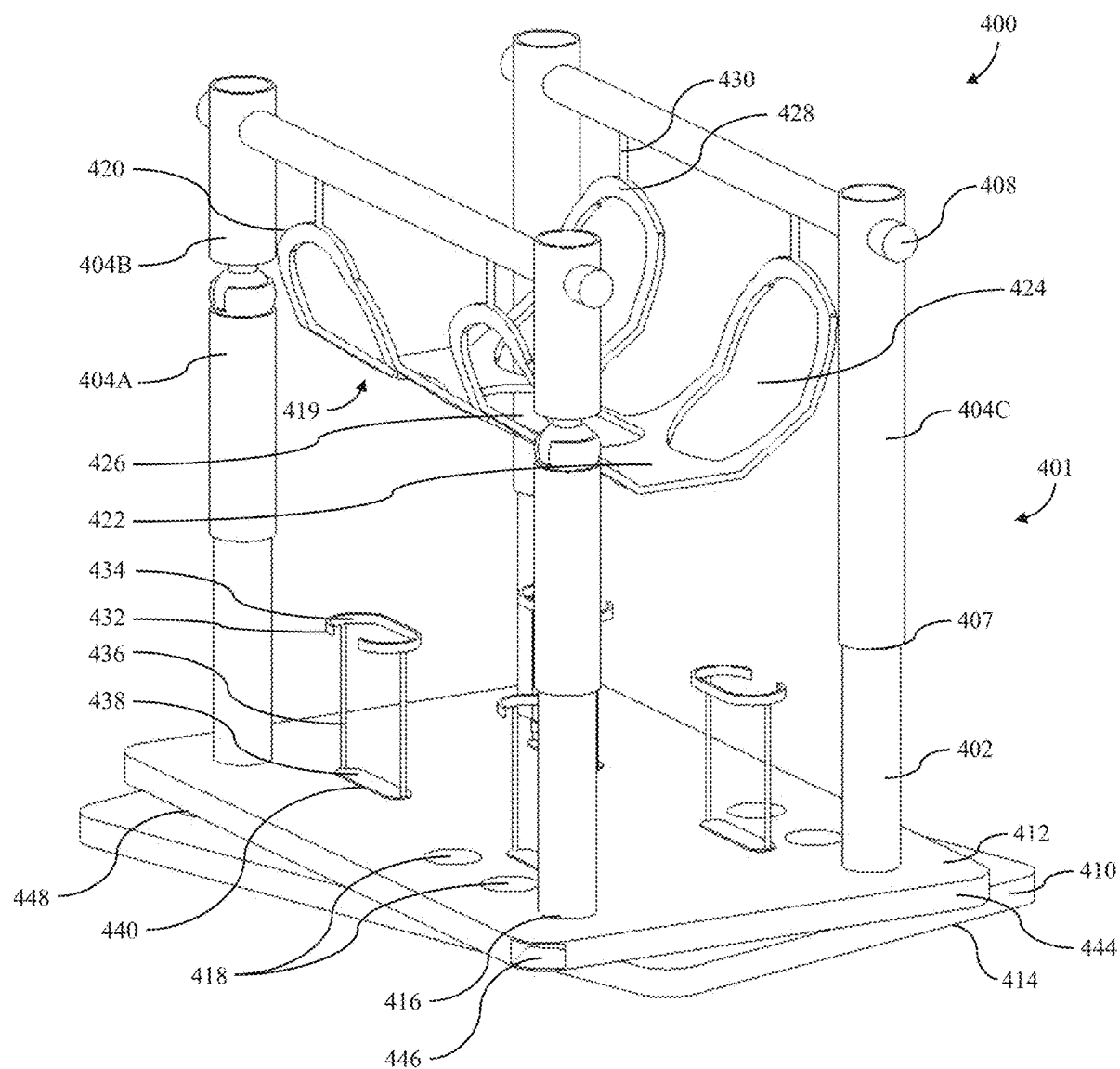
FIG. 16 shows a perspective view of a cat suspension and training apparatus in a resting configuration with an alternative adjustment mechanism for a raised structure and a rotating base.

FIG. 16 shows a perspective view of a cat suspension and training apparatus 400 in a resting configuration with an alternative adjustment mechanism for a raised structure 401 and a rotating base 444. In some examples, the apparatus 400 may comprise at least two components, a raised structure 401 and a sling 419. The raised structure 401 is positioned and configured to suspend the sling 419 above the ground or floor. As an example, the raised structure 401 may comprise a base 410, bottom support rods 402, lower intermediate support rods 404a, upper intermediate support rods 404b, top support rods 404c, configuration transitioning joints 406 and crossbeams 408.

The bottom support rods 402 may engage with the base 410 at a support rod connection interface 416 of the base 410. Bottom support rods 402, or any other rods of the raised structure 401, may be hollow or solid or a combination thereof. Additionally, the bottom support rods 402 may allow for drainage through the base 410 at or along the support rod connection interface 416 to prevent perpetually wet or unaerated interiors of the bottom support rods 402. From the support rod connection interface 416, a bottom support rod 402 may extend from the base a bottom support rod distance, upward. One end of the bottom support rod 402, the end opposite a support rod connection interface 416, the bottom support rod 402 may interface with a configuration transitioning joint 406. The configuration transitioning joint 406 may be a ball joint, hinge, limited angle hinge, flexible or bendable joint, or similar aperture that allows flexing or bending of and otherwise straight component.

On one side of the apparatus 400 described by this example, the top support rods 404c may be coupled with the configuration transitioning joint 406 on a side of the configuration transitioning joint 406 substantially opposite of the point of connection between the bottom support rod 402 and the configuration transitioning joint 406. The upper intermediate support rods 404a may extend from the configuration transitioning joint 406 a top support rod distance, upward. There may exist at least four support legs (comprising a bottom support rod 402, configuration transitioning joint 406 and top support rod 404c). Additionally, the raised structure 401 may comprise a crossbeam 408 positioned between two support legs of the raised structure 401, coupled to the support legs substantially near the end of the top support rod 404c substantially opposite the end coupled with the configuration transitioning joint 406. The crossbeams 408 may be removably or permanently coupled to the top support rods 404c, for example by rod-and-hole friction interfacing, integration into one material, or any other removable or permanent interfacing combination.

On the other side of the apparatus 400 described by this example, the upper intermediate support rods 404b may be coupled with the configuration transitioning joint 406 on a side of the configuration transitioning joint 406 substantially opposite of the point of connection between the lower intermediate support rod 404a and the configuration transitioning joint 406. The lower intermediate support rods 404a may be coupled with the height adjustment joint 407 on a side of the height adjustment joint 407 substantially opposite of the point of connection between the bottom support rod 402 and the height adjustment joint 407. The lower intermediate support rods 404b may extend from the height adjustment joint 407 a top support rod distance, upward. The upper intermediate support rods 404b may extend from the configuration transitioning joint 406 an upper intermediate support rod distance, upward. There may exist at least two support legs configured in this manner (comprising a bottom support rod 402, lower intermediate support rod 404a, upper intermediate support rod 404b, configuration transitioning joint 406, height adjustment joint 407, and top support rod 404c). Additionally, the raised structure 401 may comprise a crossbeam 408 positioned between two support legs of the raised structure 401, coupled to the support legs substantially near the end of the upper intermediate support rod 404b substantially opposite the end coupled with the configuration transitioning joint 406. The crossbeams 408 may be removably or permanently coupled to the upper intermediate support rods 404b, for example by rod-and-hole friction interfacing, integration into one material, or any other removable or permanent interfacing combination.

A base 410 of the raised structure 401 may comprise a top face 412 and bottom attachment face 414 of the base 410. Although the base may be constructed with a wide variety of materials, hard materials will more easily prevent a cat's claw from being able to sink into and adhere to the base 410, thus undermining the effectiveness of the cat immobilization apparatus 400 through suspension. The bottom attachment face 414 may be configured to removably engage a ground surface or floor surface, thus stabilizing the apparatus 400 via the raised structure 401. The bottom attachment face 414 may be made of an adhering material, such as rubber, sticky tack, or a non-permanent adhesive paint or coating, or any other adhering or frictionally-engaging material, or alternatively, may comprise removable floor- or ground-coupling devices, such as suction cups, tacks, clamps, or any other means of coupling the bottom attachment face 414 with a ground or floor surface. The top face 412 of the base 410 may comprise a support rod connection interface 416, enabling a bottom support rod 402 to be coupled with the base 410. The support rod connection interface 416 may comprise any of a variety of ways to easily couple components for easy disassembly, for example a friction fit, screw tightening, slide and lock, or any other means of removably coupling the bottom support rod 402 with the top face 412 of the base 410 at a support rod connection interface 416. In a further example, the top face 412 of the base 410 may comprise a plurality of optional locational placements for a support rod connection interface 416, thus including support rod width adjustment interfaces 418 of the base 410. The support rod width adjustment interfaces 418 may be configured as a pre-distanced set of support rod connection interfaces 416 positioned varying widths apart such that the support legs may be closer or further apart. Allowing for varying width adjustments will ensure that the raised structure 401 is configured for the size of the cat, as cats come in all sizes. Alternatively, to a pre-distanced set of support rod interfaces 416, one or more of the support legs may be slideable, or uniquely and independently adjustable about the base 410. The rod width adjustment interfaces 418 may allow for frontal, lateral, or diagonal support leg adjustment about the base 410.

A sling 419 of a cat suspension and training apparatus 400 may comprise a flexible portion 420, receiving portion 422 of the flexible portion 420, leg holes 424, an underbelly opening 426, a connection element 428 of the flexible portion 420, and a suspension structure 430. Suspension structures 430 couple the sling 419 with the raised structure 401 at a crossbeam 408, such that the sling 419 is suspended above the ground or floor. A suspension structure 430 may be a string, adhesive, clips, or any other means of coupling the sling 419 with the raised structure 401.

The apparatus 400 may additionally comprise at least one limb security strap 432. The limb security strap 432 comprises a releasable metacarpal strap 434, a connection line 436, a releasable base attachment 438, and a releasable base attachment mechanism 440. The releasable metacarpal strap 434 is positioned to loop around the metacarpal region of a cat and has an adjustable circumference to easily fit over a foot of a cat and be tightened, e.g. manually, around the metacarpal region. The connection line 436 is coupled to both the releasable metacarpal strap 434 and the releasable base attachment 438. There may be plurality of connection lines 436 for each limb security strap 432. Additionally, the connection line 436 is adjustable in length and may also be elastic to ensure that the metacarpal strap 434 can reach the metacarpal region of a cat when the releasable base attachment 438 is coupled with the top face 412 of the base 410 to accommodating varying heights of cats and varying height and width settings of the raised structure 401. The releasable base attachment mechanism 440 removably couples the releasable base attachment 438 with the top face 412 of the base 410. As an example, the releasable base attachment mechanism may be a screw, nail, tack, non-permanent adhesive, clamp, or any other means of removably adhering a limb security strap 432 to the top face 412 of the base 410, to allow for easy repositioning of the limb security strap 432 to accommodate for the varying placement of a cat in the sling 419.

In addition to the above mentioned features and capabilities of the limb security strap 432, the metacarpal strap 434 may have a receiving configuration and a closed configuration. The receiving configuration of the metacarpal strap 434 enables easy access of the strap to the metacarpal region of a cat to then enable tightening of the strap to a closed configuration around the metacarpal region of a cat, prevent or limiting range of motion of a cat's leg that is secured by the limb security strap 432.

In further examples, the apparatus 400 may rotate, swivel, or turn to provide ease of using the apparatus 400 and additional accessibility if circumstances prevent a user from maneuvering around various sides of the apparatus 400. One example of how the apparatus 400 may rotate, swivel, or turn is with a rotatable shelf 444 with a top face 412 positioned above the base 410 and also positioned above the bottom attachment face 414. The rotatable shelf 444 may have a rotatable shelf handle 446 and at least one drain 448. The rotatable shelf handle may be a cut into the shelf or an extruded handle. Additionally, the rotatable shelf 444 may have a variety of locking features, including friction-locking, pre-positioned stop points or pegs, free-rotation with a clamp lock, or any other means of locking the rotating shelf 444 in place after a desired amount of rotation.

Figure 17:
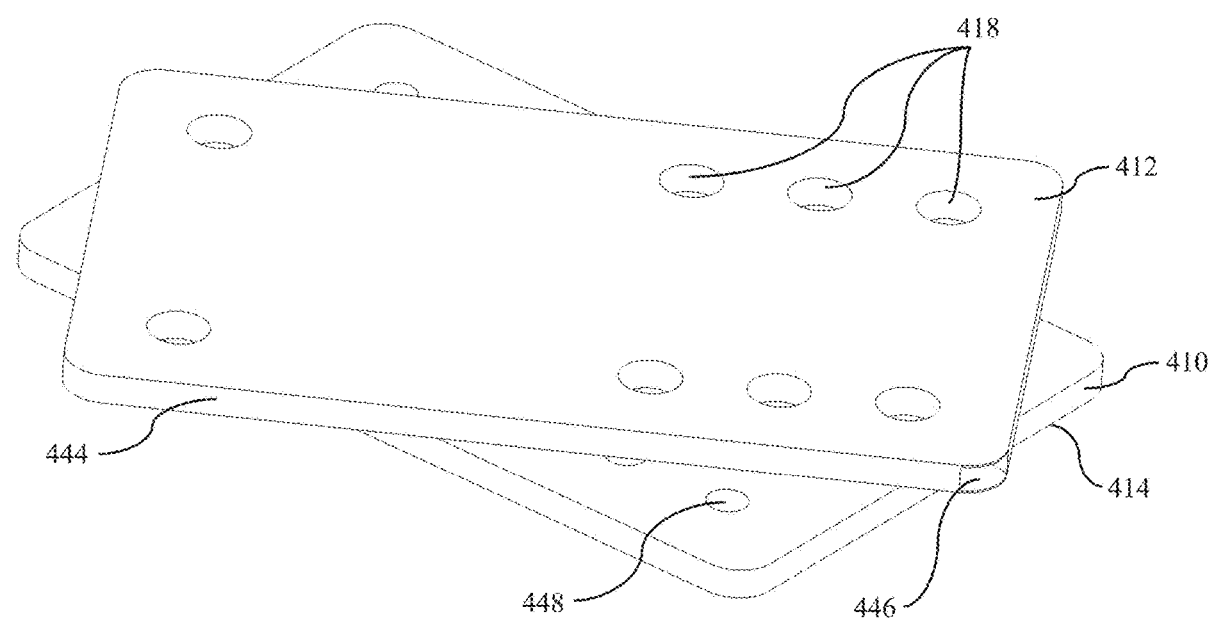
FIG. 17 shows a perspective view of the rotating base of FIG. 16.

FIG. 17 shows a perspective view of the rotatable shelf 444 of FIG. 16. A number of elements depicted in FIG. 17 are described above in the context of FIG. 16 and, thus, are not necessarily described further. In an example of a rotatable shelf 444 used in connection with bathing a cat, drains 448 are necessary to prevent water buildup between the base 410 and the rotatable shelf 444. Various sizes, shapes, and positions of drains 448 may exist on the base 410, and the support rod connection interfaces 418 may act as a drain through the rotatable shelf 444.

Figure 18:
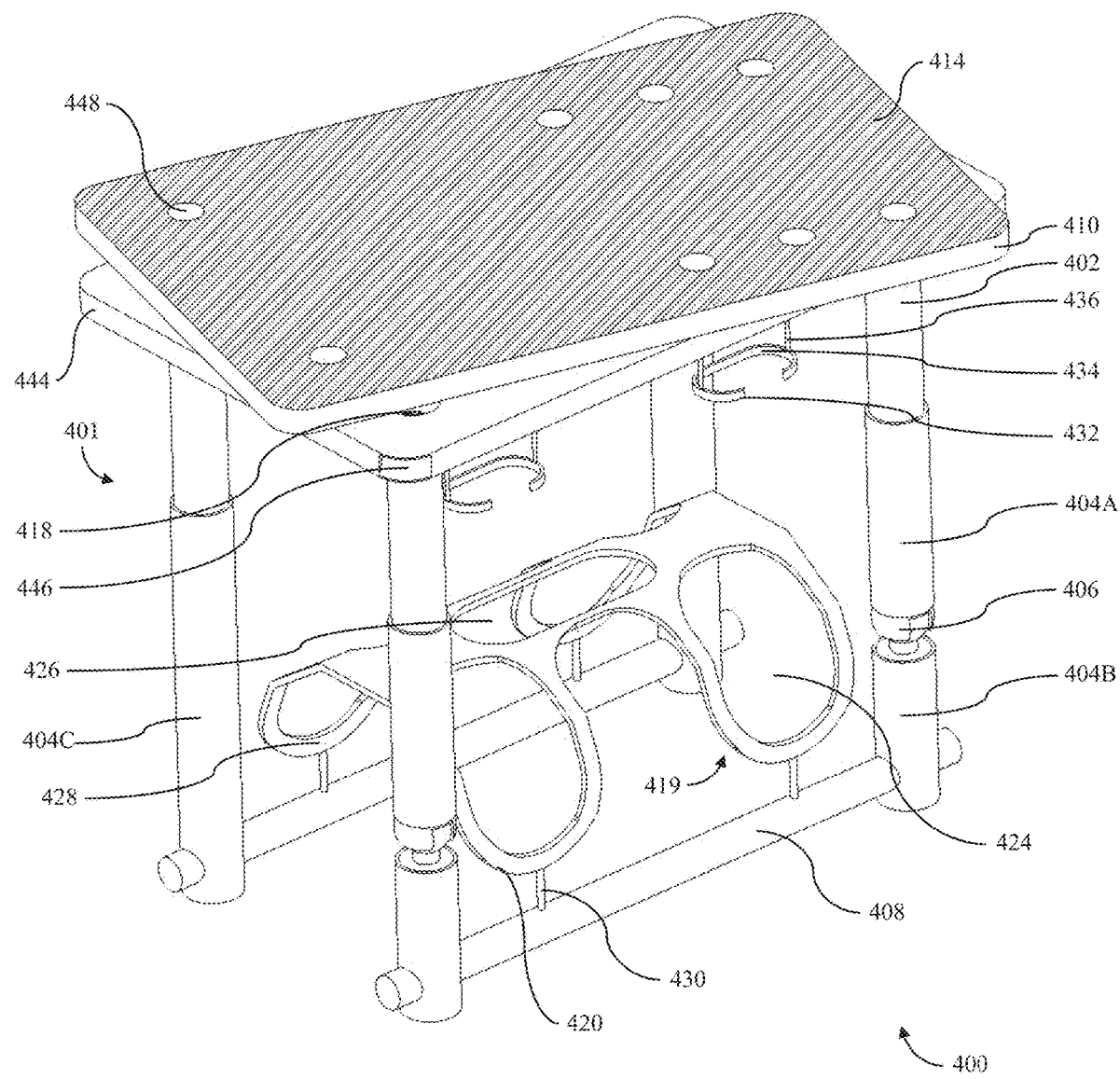
FIG. 18 shows an upside-down perspective view of a cat suspension and training apparatus in a resting configuration with an alternative adjustment mechanism for a raised structure and a rotating base.

FIG. 18 shows an upside-down perspective view a cat suspension and training apparatus 400 in a resting configuration with an alternative adjustment mechanism for a raised structure and a rotating base of FIG. 16. A number of elements depicted in FIG. 18 are described above in the context of FIG. 16 and, thus, are not necessarily described further.

In an additional aspect, the technology relates to: A system for suspending a cat, the system comprising: a raised structure; a sling comprising: a flexible portion having a receiving portion; first and second connection elements positioned on the flexible portion outside the receiving portion; and first and second suspension structures connecting the flexible portion to the raised structure to suspend the sling from the raised structure; a receiving configuration whereby the raised structure is positioned to spread the sling to separate the first and second connection elements by a first receiving distance; and a closed configuration whereby the raised structure is positioned to reduce separation between the first and second connection elements from the first receiving distance to a first closed distance, the closed configuration to be automatically configured upon receiving a threshold weight of a cat in the receiving portion of the sling.

In an example, the receiving configuration further comprising the raised structure completely suspending the sling in air. In another example, automatically repositioning the raised structure by tensionally repositioning the raised structure in a closed configuration such that the threshold weight of the cat causes the first and second suspension structures to pull on the raised structure. In a further example, the sling further comprises: third and fourth connection elements positioned on the flexible portion outside the receiving portion; and third and fourth suspension structures connecting the flexible portion to the raised structure to suspend the sling from the raised structure. In another example, the receiving configuration and the closed configuration further comprise: the raised structure positioned to spread the sling to separate the third and fourth connection elements by a second receiving distance in the receiving configuration; and the raised structure positioned to reduce separation between the third and fourth connection elements from the second receiving distance to a second closed distance in the closed configuration. In yet another example, the closed configuration positions the flexible portion such that the first connection element and the second connection element are coupled at the first closed distance. In another example, the closed configuration positions the flexible portion such that the first connection element and the second connection element are automatically secured at the first closed distance.

Still, in another example, the raised structure further comprising: two right-side support rods; two left-side support rods; a right crossbeam, supported by the two right-side support rods; a left crossbeam, supported by the two left-side support rods; and a base connected to the two right-side support rods and the two left-side support rods and having a bottom attachment face for releasably securing the base to a surface such that the base remains stable while the cat is restrained. In another example, the first and second suspension structures connecting the flexible portion to the right crossbeam and the left crossbeam. In another example, the base further comprising a rotatable shelf, the rotatable shelf positioned above the bottom attachment face and rotating independently of the bottom attachment face such that the raised structure rotates with the rotatable shelf. In another example, the base further comprising: a top face; and a limb security strap, the limb security strap comprising: a releasable base attachment; a releasable metacarpal strap, the releasable metacarpal strap to be positioned on a metacarpal region of the cat; and at least one adjustable connection line, the adjustable connection line connecting the releasable base attachment and the releasable metacarpal strap. In a further example, the limb security strap is one of four limb security straps, and wherein the base further comprises four limb security straps.

In still a further example, the flexible portion further comprises: a right portion; a left portion; a front portion; a rear portion; and four leg holes. In another example, the four leg holes further comprise: a first leg hole positioned on the front portion and the right portion of the sling; a second leg hole positioned on the front portion and the left portion of the sling; a third leg hole positioned on the rear portion and the right portion of the sling; and a fourth leg hole positioned on the rear portion and the left portion of the sling. In a further example, the flexible portion is contoured such that at least oblique abdominals, cephalo-humerals, and tail of the cat are exposed when the threshold weight of the cat is suspended in the sling. In a further still example, the flexible portion further comprising an underbelly opening, the underbelly opening positioned to enable access to an underbelly of the cat.

In an additional aspect, the technology relates to: a method of suspending a cat, the method comprising: positioning a raised structure of a cat suspension system in a receiving configuration, thereby spreading a sling of the cat suspension system to separate first and second connection elements of the sling by a first receiving distance, the sling further comprising: a flexible portion having a receiving portion, the first and second connection elements positioned on the flexible portion outside the receiving portion; and first and second suspension structures connecting the flexible portion to the raised structure to suspend the sling from the raised structure; aligning the cat with the receiving portion of the sling with the raised structure is in the receiving configuration; lowering the cat into the receiving portion of the sling with the raised structure in the receiving configuration, thereby causing a supported weight of the cat to be supported by the sling; and upon the supported weight of the cat exceeding a threshold supported weight, automatically repositioning the raised structure in a closed configuration to reduce separation between the first and second connection elements from the first receiving distance to a first closed distance, thereby restraining the cat in the sling.

In an additional example, the receiving configuration further comprising the raised structure completely suspending the sling in air. In a further example, automatically repositioning the raised structure by tensionally repositioning the raised structure in a closed configuration such that the threshold weight of the cat causes the first and second suspension structures to pull on the raised structure.

In another example, the present disclosure relates to: a means of suspending a cat in air, the means comprising: means for supporting a full weight of a cat to suspend the cat in air, the means for supporting the full weight of the cat having a receiving configuration for receiving the cat and a closed configuration for restraining the cat; means for maintaining the means for supporting the full weight of the cat in while in the receiving configuration; and means for automatically repositioning the means for supporting the full weight of the cat from the receiving configuration to the closed configuration in response to receiving a threshold weight of the cat.

While a number of aspects and embodiments have been discussed above, persons having ordinary skill in the art will recognize certain modifications, permutations, additions, and equivalents may alternatively be used or introduced. It is intended that the scope of the following claims be interpreted to include all such modifications, permutations, additions, and equivalents. The terms and expressions used herein are for description, not limitation, and there is no intention to exclude any equivalents of the aspects shown and described. In addition, any workable combination of the features and elements disclosed herein can be employed.

Having described several embodiments, it will be recognized by those of skill in the art that various modifications, alternative constructions, and equivalents may be used without departing from the spirit of the disclosure. Additionally, a number of well-known processes and elements have not been described in order to avoid unnecessarily obscuring the present disclosure. Accordingly, the above description should not be taken as limiting the scope of the disclosure.

What is claimed is:

1. A system for suspending a feline, the system comprising:

a raised structure;

a sling comprising:
a flexible portion having a receiving portion;
first and second connection elements positioned on the flexible portion outside the receiving portion; and
first and second suspension structures connecting the flexible portion to the raised structure to suspend the sling from the raised structure;
a receiving configuration whereby the raised structure is positioned to spread the sling to separate the first and second connection elements by a first receiving distance; and
a closed configuration whereby the raised structure is positioned to reduce separation between the first and second connection elements from the first receiving distance to a first closed distance, the closed configuration to be automatically configured upon receiving a threshold weight of a feline in the receiving portion of the sling.

2. The system of claim 1, the receiving configuration further comprising the raised structure completely suspending the sling in air.

3. The system of claim 1, automatically repositioning the raised structure by tensionally repositioning the raised structure in a closed configuration such that the threshold weight of the feline causes the first and second suspension structures to pull on the raised structure.

4. The system of claim 1, wherein the sling further comprises:
third and fourth connection elements positioned on the flexible portion outside the receiving portion; and
third and fourth suspension structures connecting the flexible portion to the raised structure to suspend the sling from the raised structure.

5. The system of claim 4, wherein the receiving configuration and the closed configuration further comprise:
the raised structure positioned to spread the sling to separate the third and fourth connection elements by a second receiving distance in the receiving configuration; and
the raised structure positioned to reduce separation between the third and fourth connection elements from the second receiving distance to a second closed distance in the closed configuration.

6. The system of claim 1, wherein the closed configuration positions the flexible portion such that the first connection element and the second connection element are coupled at the first closed distance.

7. The system of claim 1, wherein the closed configuration positions the flexible portion such that the first connection element and the second connection element are automatically secured at the first closed distance.

8. The system of claim 1, the raised structure further comprising:
two right-side support rods;
two left-side support rods;
a right crossbeam, supported by the two right-side support rods; a left crossbeam, supported by the two left-side support rods; and
a base connected to the two right-side support rods and the two left-side support rods and having a bottom attachment face for releasably securing the base to a surface such that the base remains stable while the feline is restrained.

9. The system of claim 8, the first and second suspension structures connecting the flexible portion to the right crossbeam and the left crossbeam.

10. The system of claim 8, the base further comprising a rotatable shelf, the rotatable shelf positioned above the bottom attachment face and rotating independently of the bottom attachment face such that the raised structure rotates with the rotatable shelf.

11. The system of claim 8, the base further comprising:
a top face; and
a limb security strap, the limb security strap comprising:
a releasable base attachment;
a releasable metacarpal strap, the releasable metacarpal strap to be positioned on a metacarpal region of the feline; and
at least one adjustable connection line, the adjustable connection line connecting the releasable base attachment and the releasable metacarpal strap.

12. The system of claim 11, wherein the limb security strap is one of four limb security straps, and wherein the base further comprises four limb security straps.

13. The system of claim 1, wherein:
the flexible portion further comprises:
a right portion;
a left portion;
a front portion;
a rear portion;
and four leg holes.

14. The system of claim 13, wherein the four leg holes further comprise:
a first leg hole positioned on the front portion and the right portion of the sling;
a second leg hole positioned on the front portion and the left portion of the sling;
a third leg hole positioned on the rear portion and the right portion of the sling; and
a fourth leg hole positioned on the rear portion and the left portion of the sling.

15. The system of claim 1, wherein the flexible portion is contoured such that at least oblique abdominals, cephalohumerals, and tail of the feline are exposed when the threshold weight of the feline is suspended in the sling.

16. The system of claim 1, the flexible portion further comprising an underbelly opening, the underbelly opening positioned to enable access to an underbelly of the feline.

17. A system for suspending a feline, the system comprising:
a raised structure;
a sling comprising:
a flexible portion having a receiving portion;
first and second connection elements positioned on the flexible portion outside the receiving portion; and
first and second suspension structures connecting the flexible portion to the raised structure to suspend the sling from the raised structure;
a receiving configuration whereby the raised structure is positioned to spread the sling to separate the first and second connection elements by a first receiving distance; and
a closed configuration whereby the raised structure is positioned to reduce separation between the first and second connection elements from the first receiving distance to a first closed distance, the closed configuration to be automatically configured upon receiving a threshold weight of a feline in the receiving portion of the sling;
wherein the raised structure is configured to have a first angle in the receiving configuration and a second angle in the closed configuration.

* * * * *